United States Patent
Moussakov et al.

(10) Patent No.: US 11,690,151 B2
(45) Date of Patent: Jun. 27, 2023

(54) APPARATUS AND METHODS FOR SUPPLYING POWER

(71) Applicant: SIGNIFY HOLDING B.V., Eindhoven (NL)

(72) Inventors: Milen Moussakov, New Westminster (CA); Gregory Bernard Sheehan, Delta (CA)

(73) Assignee: SIGNIFY HOLDING B.V., Eindhoven (NL)

(*) Notice: Subject to any disclaimer, the term of this patent is extended or adjusted under 35 U.S.C. 154(b) by 186 days.

(21) Appl. No.: 16/932,877

(22) Filed: Jul. 20, 2020

(65) Prior Publication Data

US 2021/0051782 A1   Feb. 18, 2021

Related U.S. Application Data

(62) Division of application No. 15/983,857, filed on May 18, 2018, now Pat. No. 10,750,594, which is a division of application No. 12/896,619, filed on Oct. 1, 2010, now Pat. No. 9,992,827.

(51) Int. Cl.
*H05B 45/44* (2020.01)

(52) U.S. Cl.
CPC .............. *H05B 45/44* (2020.01); *Y02B 20/30* (2013.01)

(58) Field of Classification Search
CPC ......... H05B 45/44; H05B 45/14; Y02B 20/30
USPC ....................................................... 315/192
See application file for complete search history.

(56) References Cited

U.S. PATENT DOCUMENTS

| | | | |
|---|---|---|---|
| 4,591,728 A | 5/1986 | Kruger et al. |
| 5,532,528 A | 7/1996 | Lammers |
| 5,568,035 A | 10/1996 | Kato et al. |
| 5,581,454 A | 12/1996 | Collins |
| 5,587,894 A | 12/1996 | Naruo |
| 5,600,550 A | 2/1997 | Cook, II |
| 5,608,614 A | 3/1997 | Ohnishi et al. |
| 5,610,807 A | 3/1997 | Kanda |
| 5,668,711 A | 9/1997 | Lavieville et al. |
| 5,734,205 A | 3/1998 | Okamura et al. |
| 5,905,371 A | 5/1999 | Limpaecher |

(Continued)

FOREIGN PATENT DOCUMENTS

| JP | 2002-8409 A | 1/2002 |
| WO | 2010027254 A1 | 3/2010 |

OTHER PUBLICATIONS

Ueno, F. et al., "Design and Realization of a Switched-Capacitor AC-DC Converter With a Low Output-Voltage Ripple," IEEE 1991, pp. 1087-1090, vol. 2, Proceedings of the 33rd Midwest Symposium On Circuits and Systems, 1990.

(Continued)

*Primary Examiner* — Daniel D Chang

(57) ABSTRACT

A switched capacitor array having a plurality of capacitors arranged in a plurality of branches having different numbers of capacitors, and a plurality of switches connected to selectively couple the capacitors across the input or the output may be used for powering a variety of loads. A switched LED array may be dynamically configured based on a voltage supplied thereto, which may be supplied by a switched capacitor array. A lighting apparatus may be provided with first and second blocks, each block comprising a switched capacitor array, a switched LED array, and a control system.

9 Claims, 22 Drawing Sheets

(56) References Cited

U.S. PATENT DOCUMENTS

| | | | |
|---|---|---|---|
| 6,005,788 A | 12/1999 | Lipo et al. | |
| 6,183,100 B1 * | 2/2001 | Suckow | G09F 9/33 340/471 |
| 6,313,513 B1 | 11/2001 | Imanishi et al. | |
| 6,317,343 B1 | 11/2001 | Okamura et al. | |
| 6,323,623 B1 | 11/2001 | Someya et al. | |
| 6,351,079 B1 | 2/2002 | Willis | |
| 6,528,954 B1 | 3/2003 | Lys et al. | |
| 6,577,072 B2 | 6/2003 | Saito et al. | |
| 6,864,641 B2 | 3/2005 | Dygert | |
| 6,989,658 B2 | 1/2006 | Allwang et al. | |
| 6,989,807 B2 | 1/2006 | Chiang | |
| 7,009,580 B2 | 3/2006 | Leung | |
| 7,012,463 B2 | 3/2006 | Nairn | |
| 7,190,210 B2 | 3/2007 | Azrai et al. | |
| 7,239,194 B2 | 7/2007 | Azrai et al. | |
| 7,474,681 B2 | 1/2009 | Lin et al. | |
| 7,495,418 B2 | 2/2009 | Yano et al. | |
| 7,518,319 B2 | 4/2009 | Konno et al. | |
| 7,531,843 B2 | 5/2009 | Lin et al. | |
| 7,544,524 B2 | 6/2009 | Lin et al. | |
| 7,554,221 B2 | 6/2009 | Cassel | |
| 7,564,198 B2 * | 7/2009 | Yamamoto | H05B 45/24 315/192 |
| 7,633,463 B2 | 12/2009 | Negru | |
| 7,701,149 B2 | 4/2010 | Lin | |
| 7,781,979 B2 | 8/2010 | Lys | |
| 7,936,135 B2 | 5/2011 | Hum et al. | |
| 2003/0184314 A1 | 10/2003 | Barak | |
| 2004/0061451 A1 | 4/2004 | Tung | |
| 2005/0151717 A1 | 7/2005 | Seo | |
| 2007/0133230 A1 | 6/2007 | Lin | |
| 2007/0210722 A1 | 9/2007 | Kono et al. | |
| 2007/0273299 A1 | 11/2007 | Miskin et al. | |
| 2009/0051296 A1 | 2/2009 | Ball | |
| 2009/0160365 A1 | 6/2009 | Niemitalo | |
| 2009/0160370 A1 | 6/2009 | Tai et al. | |
| 2009/0295292 A1 | 12/2009 | Harmgardt et al. | |
| 2009/0296431 A1 | 12/2009 | Borisov | |
| 2009/0309417 A1 | 12/2009 | Walley | |
| 2009/0309645 A1 | 12/2009 | Isaacson et al. | |
| 2009/0309855 A1 | 12/2009 | Wang et al. | |
| 2009/0315477 A1 | 12/2009 | Kinsella | |
| 2010/0007600 A1 | 1/2010 | Deurenberg et al. | |
| 2010/0038907 A1 | 2/2010 | Hunt | |
| 2010/0109557 A1 | 5/2010 | Bouchard | |
| 2010/0123403 A1 | 5/2010 | Reed | |
| 2010/0134018 A1 | 6/2010 | Tziony et al. | |
| 2010/0141169 A1 | 6/2010 | Summerland et al. | |
| 2010/0171145 A1 | 7/2010 | Morgan et al. | |
| 2010/0181923 A1 | 7/2010 | Hoogzaad | |
| 2011/0248640 A1 | 10/2011 | Welten | |

OTHER PUBLICATIONS

Ueno, F. et al., "Realization of a Switched-Capacitor AC-DC Converter Using a New Phase Controller," IEE, pp. 1057-1060, vol. 2, IEEE International Symposium On Circuits and Systems, Jun. 11-14, 1991.

Ishimatsu, K., et al., "A DC-AC Converter Using a Voltge Equational Type Switched-Capacitor Transfermer," IEEE, 1998.

Tse, C.K., et al., "On Lossless Switched-Capacitor Power Converters," IEEE Transactions On Power Electronics, vol. 10, No. 3, May 1995.

* cited by examiner

APPARATUS AND METHODS FOR SUPPLYING POWER

TECHNICAL FIELD

The invention relates to supplying electrical power to devices which require relatively constant levels of DC voltage. Certain aspects relate to LED light fixtures which connect directly to AC power lines.

BACKGROUND

Prior art systems for supplying power from AC power lines to devices which operate on DC voltages typically involve the use of components such as filters, bridges and/or switched-mode power supplies (SNIPS) comprising inductive transformers or inductors. Such components may adversely affect efficiency and power factor.

The inventor has determined a need for improved power supply systems which may be used to connect dimmable LED lighting fixtures directly to AC Mains. The inventor has also determined a need for LED lighting fixtures which can mimic the characteristics of incandescent light fixtures. The inventor has also determined a need for power supply systems which include power factor correction when a TRIAC dimmer is being used.

SUMMARY

The following embodiments and aspects thereof are described and illustrated in conjunction with systems, tools and methods which are meant to be exemplary and illustrative, not limiting in scope.

One aspect provides an apparatus comprising a switched capacitor array connected between an input connectable to a varying input voltage and an output connectable to a load. The switched capacitor array has a plurality of capacitors arranged in a plurality of branches having different numbers of capacitors, and a plurality of switches connected to selectively couple the capacitors across the input or the output. A control system is configured to operate the switches to connect the capacitors of a selected branch in series across the input to charge the capacitors of the selected branch. The number of capacitors in the selected branch is selected based on an input voltage level, and the selected branch varies as the input voltage level changes. The control system also operates the switches to sequentially connect capacitors of branches other than the selected branch across the output to discharge the capacitors.

One aspect provides a method comprising determining an input voltage waveform present at an input, sequentially connecting selected branches of a plurality of branches of series connected capacitors across the input to be charged, wherein a number of series connected capacitors in the selected branches varies based on the input voltage waveform, and sequentially connecting charged capacitors across an output to be discharged.

One aspect provides an apparatus comprising a switchable LED array comprising a plurality of strings of LEDs, each string selectably connectable in parallel across an input and comprising a selectable number of series connected LEDs. The plurality of strings comprise strings with different selectable numbers of series connected LEDs. A control system is configured to dynamically vary a number of active strings connected in parallel across the input and the selectable number of series connected LEDs in the active strings based on a voltage level at the input.

One aspect provides an apparatus comprising a first input connectable to a first line of an AC voltage source, a second input connectable to a second line of the AC voltage source, a first block comprising a first switchable capacitor array connected to the first input and the second input and a first switchable LED array connected to the first switchable capacitor array and the first input, and, a second block comprising a second switchable capacitor array connected to the first input and the second input and a second switchable LED array connected to the second switchable capacitor array and the second input.

One aspect provides a control system for an array of LEDs. The control system is configured to monitor a current and a voltage provided to the array of LEDs to determine an actual LED power and control the LEDs based on the actual LED power.

One aspect provides a method for controlling an array of LEDs comprising monitoring a current and a voltage provided to the array of LEDs, determining an actual power of the array of LEDs, and controlling the array of LEDs based on the actual power.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
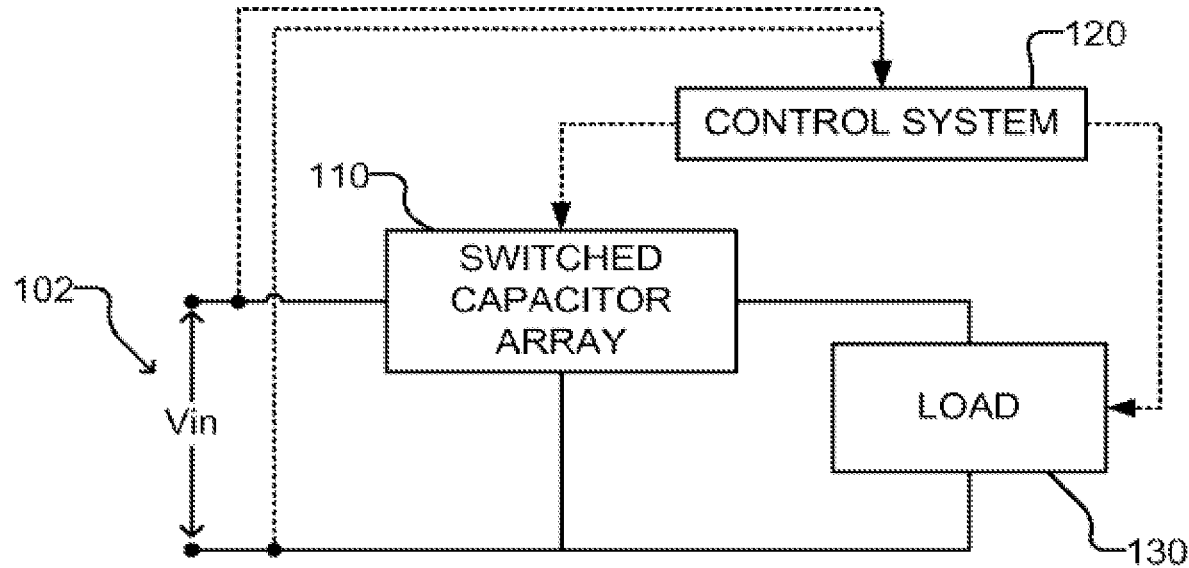
FIG. 1 shows a power supply system according to an example embodiment.

FIG. 1 shows a system 100 in which a switched capacitor array 110 is controlled by a controller 120 to supply power to a load 130. System 100 comprises an input 102 connected to a variable input voltage. Capacitor array 110 comprises a plurality of capacitors and a plurality of switches controlled by control system 120 for selectively connecting the capacitors to be charged across input 102, and to be discharged to power load 130. Control system 120 is configured to monitor the voltage at input 102 and control the switches of capacitor array 110 in response to input voltage conditions, as described below.

Control system 120 operates the switches of capacitor array 110 to connect a number of capacitors in series across the input based on the input voltage to charge the capacitors, and to sequentially connect charged capacitors to power load 130 by discharging the capacitors either one at a time or in groups of the same size, such that load 130 is supplied with a relatively constant voltage. In some embodiments, system 100 is configured to be connected directly to a standard input voltage source to provide power to load 130 without the use of any filter, bridge or switched mode power supply. For example, in some embodiments, system 100 is configured to receive any of a wide variety of AC input voltage waveforms (e.g., sinusoidal and non-sinusoidal), voltage levels, and frequencies. In some embodiments, system 100 may be configured to provide a generally stable output voltage waveform in response to a wide range of input voltage conditions, such that the operation of loads powered by system 100 may be substantially unaffected by changes in input voltage which may occur due to brown outs or other power interruptions.

Figure 1A:
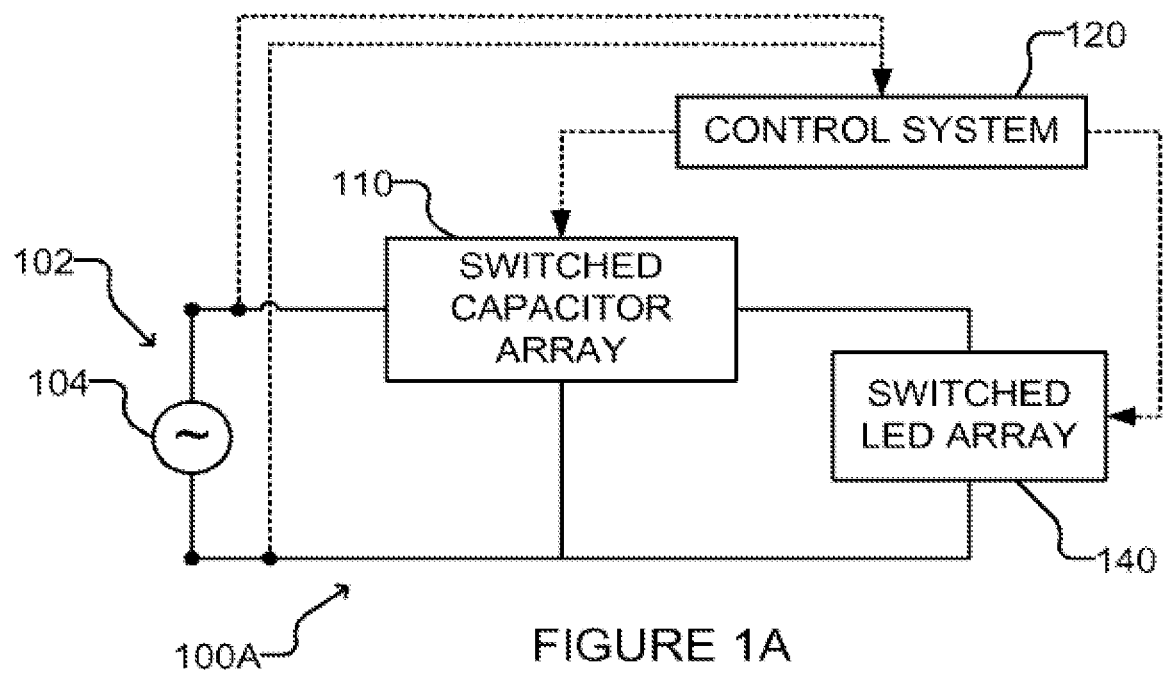
FIG. 1A shows a power supply system connected to a switched LED array according to another example embodiment.

FIG. 1A shows an example system 100A wherein capacitor array 110 supplies power to a switched LED array 140. In the FIG. 1A example, input 102 is connected to an AC voltage source 104. AC voltage source 104 may, for example, comprise a standard sinusoidal AC supply voltage, or may comprise a non-sinusoidal voltage such as a "phase cut" voltage supplied from a TRIAC-based dimmer. In some embodiments, system 100A is operable to maintain a constant, regulated light output from LED array 140 over a first range of input voltage levels (e.g. 85 to 132V for a 110V mains supply), and to provide controllably dimmed light output from LED array 140 over a second range of input voltage levels (e.g., 0 to 85V for a 110V supply). The term "LED" as used herein is to be understood to include any electroluminescent diode or other type of carrier injection/junction-based component that generates electromagnetic radiation in response to an electrical signal, including, without limitation, semiconductor-based structures that emit light in response to current, light emitting polymers, electroluminescent structures, and the like. The term LED may refer to any type of light emitter (including semi-conductor and organic light emitting diodes) that generate radiation in the visible, infrared and/or ultraviolet spectrums.

In the FIG. 1A example and other examples discussed below switched capacitor arrays are used to power LED arrays, although it is to be understood that in other embodiments capacitor arrays could also supply power to other types of loads. For example, capacitor arrays according to various embodiments may be suitable for supplying power to any type of load having any sort of voltage, current or power requirements.

Figure 2:
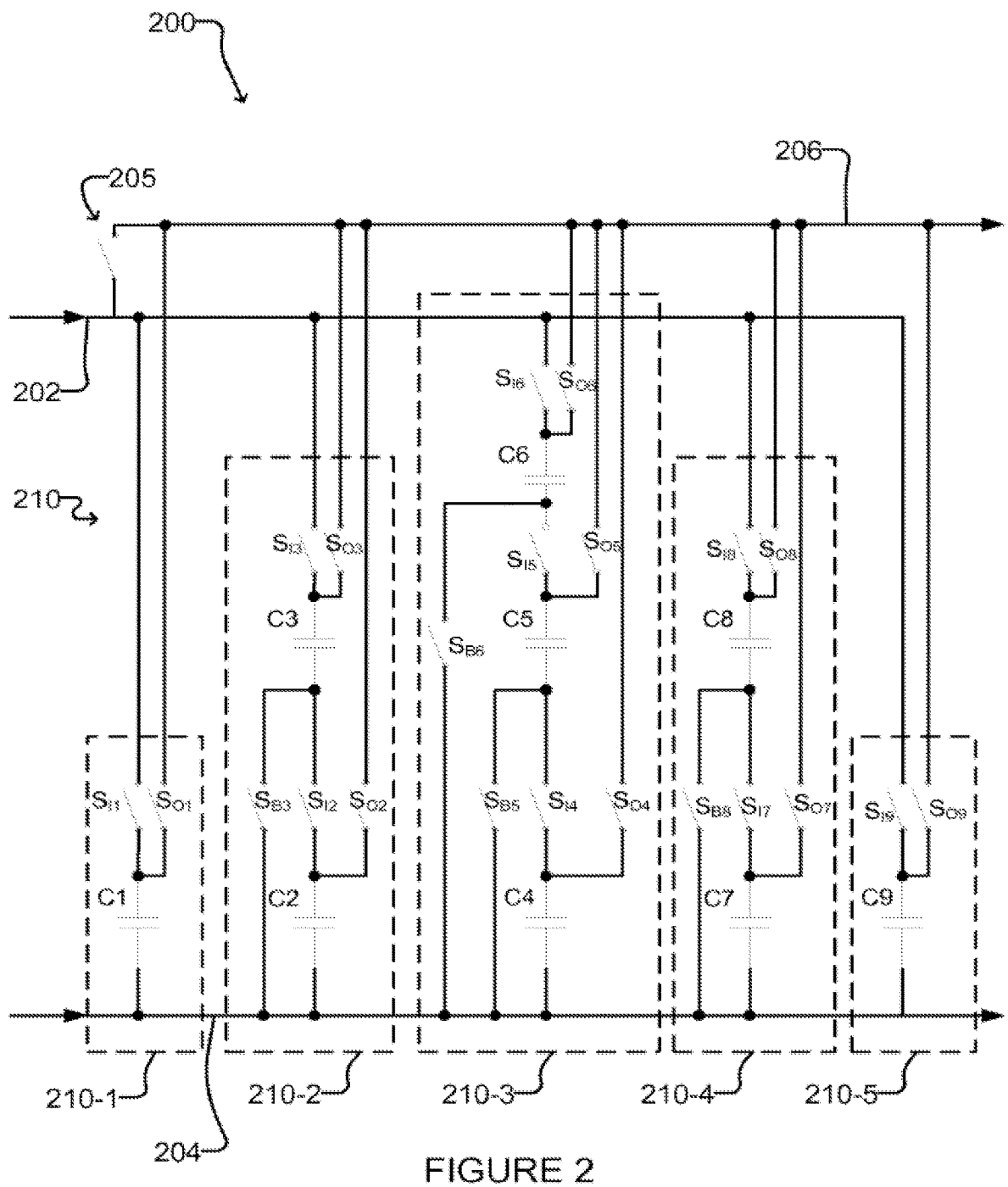
FIG. 2 shows an example switched capacitor array.

FIG. 2 shows an example switched capacitor array 200. Array 200 comprises a plurality of branches 210 selectably connectable between a first line 202 and a second line 204 under control of a control system (not shown in FIG. 2). Lines 202 and 204 are connected to an AC input voltage (not shown in FIG. 2). Each branch 210 comprises at least one capacitor, and at least one switch. In some embodiments, the capacitors may all have the same capacitances. In some embodiments, the capacitors may have different capacitances. The switches may comprise, for example, MOSFET-based switches. The control system is configured to operate the switches to selectably connect the capacitors of each branch in series between lines 202 and 204 for charging. Each capacitor is also selectably connectable between line 204 and an output line 206 for discharging. Output line 206 may be connected to provide power to a switched LED array or other load. Line 204 is also connected to the load. In some embodiments a bypass switch 205 may be provided between lines 202 and 206 for selectably connecting the load directly to the input voltage.

The control system sequentially selects branches for charging based on the number of capacitors in each branch, and controls the charging time for each branch 210. In some embodiments, the control system selects branches and controls charging times such that as the input voltage varies sinusoidally the capacitors of each branch are charged to substantially the same voltage. In some embodiments, the control system selects branches and controls charging times such that the capacitors are charged to different voltages. The capacitors may be charged to a nominal voltage which is less than the maximum voltage for the capacitors. The capacitors may be discharged by individually connecting charged capacitors one at time across lines 204 and 206. In some embodiments, the capacitors may be only partially discharged (e.g., the capacitor may have a low "depth of discharge") to reduce ripple in the output voltage. In some embodiments, two or more capacitors may be connectable in series across the output, such that the capacitors may be discharged in groups of equal numbers to provide a higher output voltage in a "boost mode". In embodiments which support boost mode, additional "boost" switches (not shown in FIG. 2) may be provided to selectably connect the capacitors in groups of equal numbers across the output.

Figure 2A:
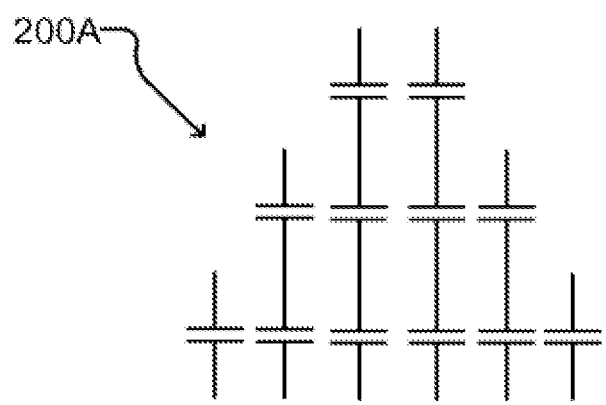
FIG. 2A-C schematically illustrate other example switched capacitor arrays.
Figure 2B:
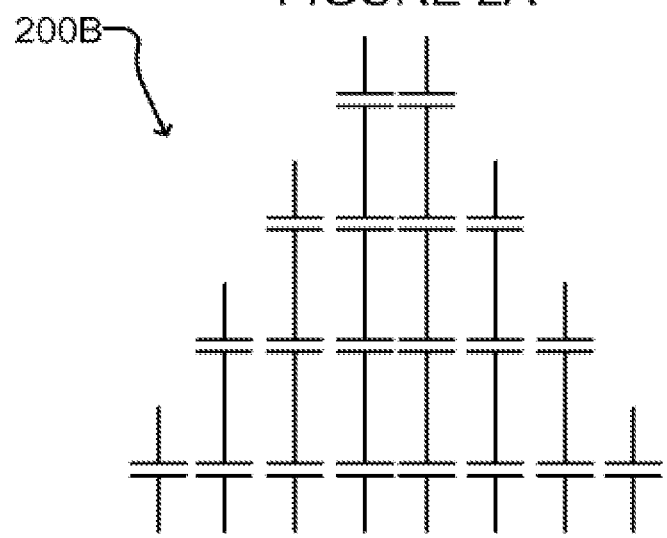
Figure 2C:
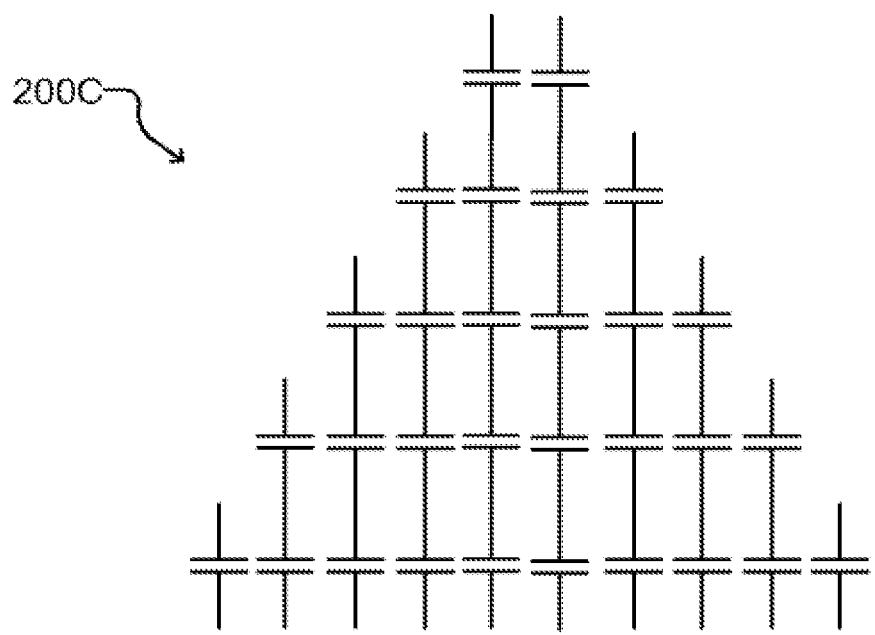

The example of FIG. 2 shows nine capacitors arranged in five branches 210 (individually numbered 210-1 to 210-5), but it is to be understood that array 200 could have a different number of capacitors and branches 210. For example, in some embodiments, a capacitor array may be provided having an even number of branches arranged in pairs of equal number of series connected capacitors. In some embodiments, a "central" pair of branches have a highest number of capacitors, and the other pairs of branches are symmetrically arranged on either side of the central pair, with an "outer" pair of branches having one capacitor each. FIGS. 2A to 2C schematically illustrate some example switched capacitor arrays (the switches and input/output lines are not shown in FIGS. 2A to 2C). FIG. 2A shows an array 200A having twelve capacitors arranged in six branches, with two branches having only one capacitor, two branches having two capacitors, and two branches having three capacitors. FIG. 2B shows an array 200B having twenty capacitors arranged in eight branches, with two branches having only one capacitor, two branches having two capacitors, two branches having three capacitors, and two branches having four capacitors. FIG. 2C shows an array 200C having thirty capacitors arranged in ten branches, with two branches having only one capacitor, two branches having two capacitors, two branches having three capacitors, two branches having four capacitors, and two branches having five capacitors. Other numbers of capacitors and arrangements of branches are also possible.

In some embodiments, a single switched capacitor array may be configured to accept a wide range of AC input voltage levels. In other embodiments, the switched capacitor array may be specifically adapted to accommodate a particular AC input voltage. The number of branches, number of capacitors in each branch, and characteristics of the capacitors may be selected based on the expected input voltage, to accommodate standard voltages for manufactured capacitors, and the output power requirements (e.g., voltage ripple). In general, the greater number of capacitors in the array, the smaller the individual capacitances may be and the smaller the voltage ripple. Conversely, using fewer capacitors generally requires higher individual capacitances and results in a higher voltage ripple. For example, for a standard 220V AC power supply, an array may be configured such that the branch(es) with the highest number of capacitors comprise three series connected capacitors (a "three level" array), and the capacitors may comprise 75 volt capacitors. Similarly, for a standard 220V AC power supply, a four level array may use 60 volt capacitors, a 5 level array may use 50 volt capacitors, a six level array may use 40 volt capacitors, etc. As another example, for an array like the example of FIG. 2B and an expected AC input voltage of 90 to 132 volts, 50 volt capacitors may be used and charged to a nominal voltage of 39 volts.

Returning to the example of FIG. 2, branch 210-1 comprises capacitor C1, branch 210-2 comprises capacitors C2 and C3, branch 210-3 comprises capacitors C4, C5 and C6, branch 210-4 comprises capacitors C7 and C8, and branch 210-5 comprises capacitor C9. Each capacitor CX has an input switch $S_{IX}$ associated therewith for selectively connecting that capacitor to line 202 (or to another capacitor in series between capacitor CX and line 202). Each capacitor CX has an output switch $S_{OX}$ associated therewith for selectively connecting that capacitor to line 206. Capacitors C3, C5, C6 and C8 also have bypass switches $S_{B3}$, $S_{B5}$, $S_{B6}$ and $S_{B8}$ respectively associated therewith for selectively connecting these capacitors directly to line 204. Thus, the capacitors in each branch 210 may be charged by closing all of the input switches $S_{IX}$ in that branch, thereby connecting the capacitors of that branch in series between lines 202 and 204, while keeping output switches $S_{OX}$ and any bypass switches $S_{BX}$ open. Any capacitor CX not in a branch being charged may be discharged by closing the associated output switch $S_{OX}$ and any bypass switch $S_{BX}$ (for capacitors not directly connected to line 204), thereby connecting that capacitor between lines 204 and 206, while keeping the associated input switch $S_{IX}$ open. In some embodiments, the depth of discharge of the capacitors may be relatively low to reduce ripple in the output voltage. In some embodiments, additional boost switches (not shown in FIG. 2) may be provided to selectably connect two or more capacitors in series between lines 204 and 206.

Switched capacitor arrays such as the example arrays shown in FIGS. 2-2C are operable to produce output voltages having a relatively constant DC level with a sawtooth-like ripple voltage. The frequency and amplitude of the ripple voltage is determined by the number of capacitors being discharged and the depth of the discharge. Some embodiments provide switched LED arrays which may be dynamically configured to adapt to the output voltage provided by such switched capacitor arrays.

Figure 3A:
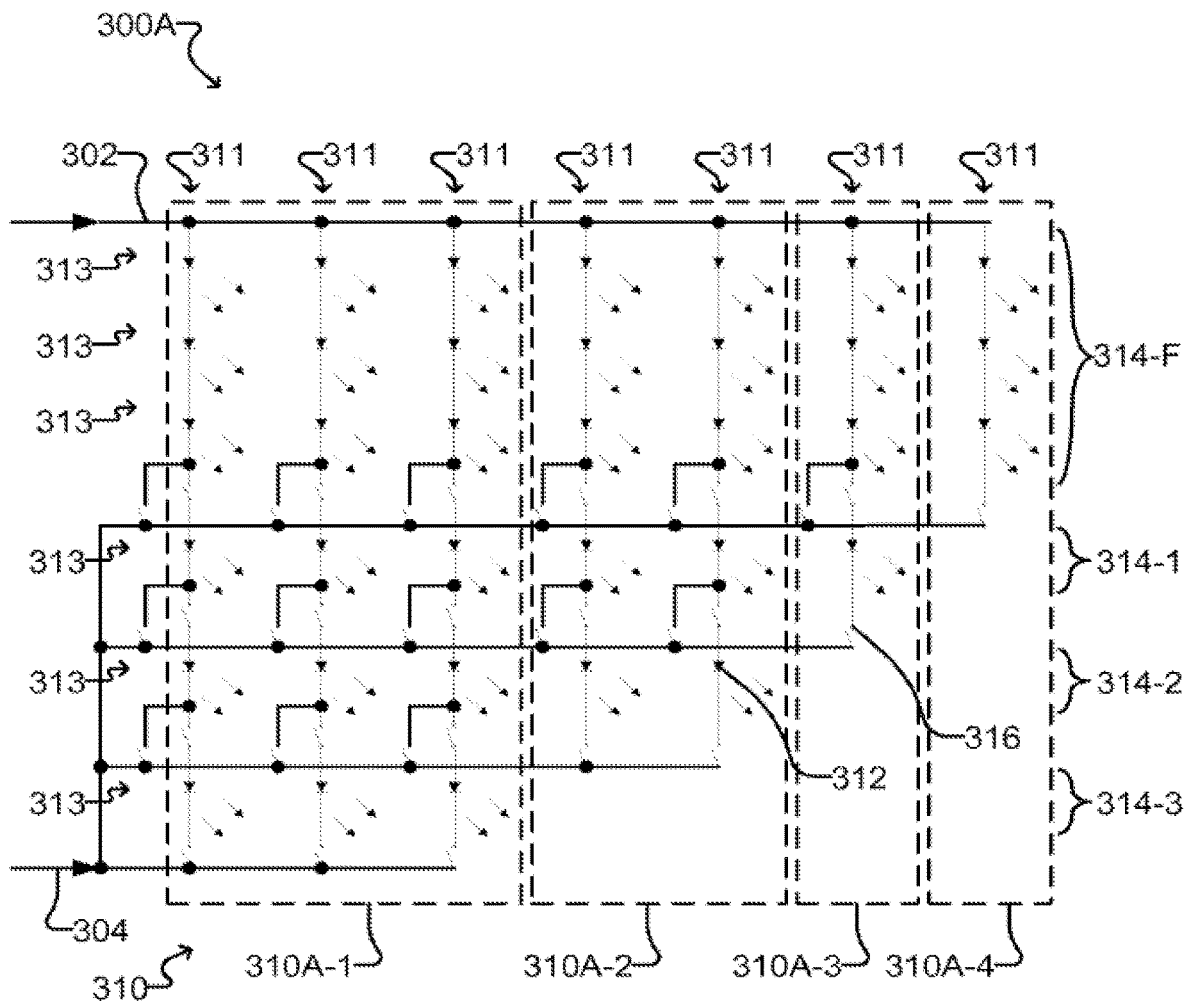
FIG. 3A shows an example switched LED array.

FIG. 3A shows an example switched LED array 300A. Array 300A comprises a plurality of LEDs 312 arranged in a plurality of columns or strings 311 and a plurality of rows 313. The LEDs 312 of array 300A are also grouped into a plurality of sub-arrays 310 (individually numbered 310A-1, 310A-2, 310A-3 and 310A-4) selectably connectable between first line 302 and second line 304. Each sub-array 310 comprises a plurality of LEDs 312 arranged in one or more columns or strings 311, and one or more switches 316 for selectively connecting the LEDs 312 in each string 311 between lines 302 and 304. The switches may comprise, for example, MOSFET-based switches. Lines 302 and 304 are connected to receive an input voltage which varies over time. The input voltage may, for example, comprise the output from a switched capacitor array such as array 200 of FIG. 2. Switches 316 are controllable by a control system (not shown) to connect a selectable number of strings 311 between lines 302 and 304 and to vary the number of energized LEDs 312 in each string. The number of active strings 311 connected between lines 302 and 304, and the number of energized LEDs in each active string 311 may be varied dynamically in conjunction with the input voltage level on lines 302 and 304. In some embodiments, the number of active strings 311 connected between lines 302 and 304 may be selected based on a user input such as, for example, provided by a dimmer control.

LEDs 312 are arranged into a plurality of levels 314 (individually numbered 314-F, 314-1, 314-2 and 314-3). In the FIG. 3A example, level 314-F comprises three rows 313 of LEDs 312, and levels 314-1, 314-2 and 314-3 each have a single additional row 313 of LEDs 312. Switches 316 may be operated to selectively energize all of the LEDs 312 of each active string up to a desired level 314 under control of the control system (e.g., if level 314-1 were the desired level, LEDs 312 in levels 316-F and 314-1 would be energized). Not all sub-arrays 310 have LEDs 312 in all levels 314. Sub-array 310A-1 comprises three strings 311, each having LEDs 312 in all of levels 314-F, 314-1, 314-2 and 314-3. Sub-array 310A-2 comprises two strings 311 having LEDs 312 in levels 314-F, 314-1 and 314-2. Sub-array 310A-3 comprises a single string 311 having LEDs 312 in levels 314-F and 314-1. Sub-array 310A-4 comprises a single string 311 having LEDs 312 in only level 314-F. Four sub-arrays 310 and four levels 314 are shown in the FIG. 3A example, but it is to be understood that different numbers of sub-arrays and different numbers of levels may be provided, and that the number of sub-arrays does not need to be the same as the number of levels.

In some embodiments, level 314-F may be a "fixed" level, such that for any active string 311, at least the LEDs 312 in fixed level 314-F are energized. The number of rows 313 of LEDs 312 in fixed level 314-F may be selected based on an expected minimum operating voltage. For example, the number of rows 313 in fixed level 314-F may be a function of the voltage discharged by the capacitors of a switched capacitor array when a TRIAC-type dimmer is in its minimum position.

In some embodiments, the minimum voltage provided by the capacitor array will be equal to the forward voltage of one LED, and the LED array will not have a "fixed" level (or will have a fixed level with only one row of LEDs). For example, in some embodiments designed to work with low voltages (e.g. for 12V or 24V AC supplies), use of a fixed level with more than one row of LEDs may be desirable in some embodiments designed to work with higher voltages because it can simplify design of the control system and reduce the number of switches required.

Figure 3B:
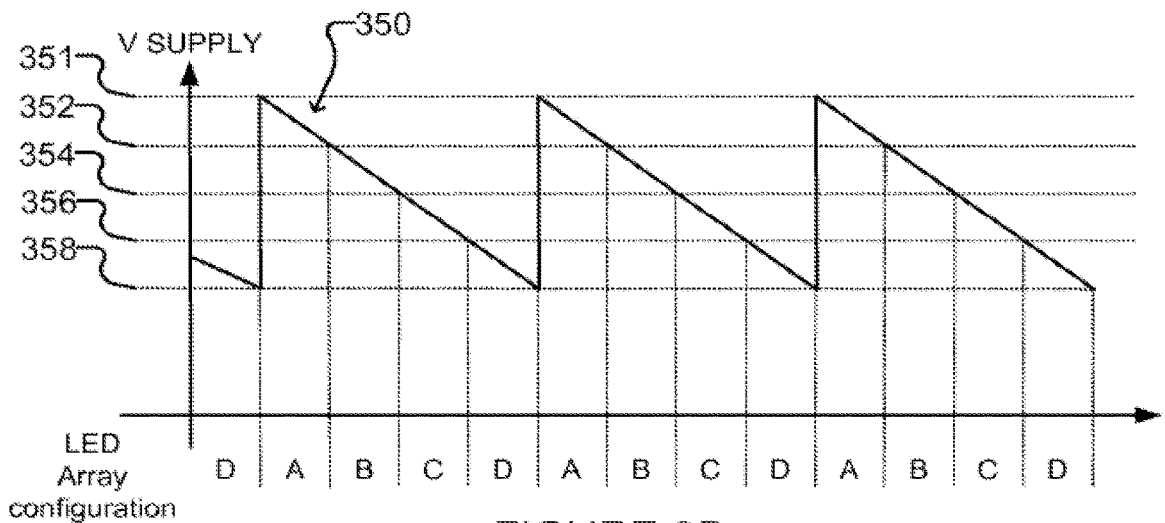
FIG. 3B shows an example supply voltage waveform for a switched LED array.

The example array 300A of FIG. 3A may be suitable for LED supply voltages which vary in a generally linear manner. FIG. 3B shows an example LED supply voltage waveform 350. Waveform 350 may, for example, comprise the output from a switched capacitor array wherein the capacitors are not charged to their maximum voltage and only partially discharged, such that the discharge voltage is approximately linear (the discharge voltage may not be exactly linear, but will generally also not be a purely capacitive discharge waveform due to load characteristics). Waveform 350 is periodic and generally sawtooth-like, with the voltage descending from an initial level 351 (which is within an acceptable voltage range for array 300A), through levels 352 354 and 356, to a minimum level 358 in each period. Level 352 may correspond to a forward voltage of a string of LEDs with a highest number of energized LEDs (e.g. all levels of LEDs are energized). Levels 354, 356 and 358 may likewise correspond to forward voltages of strings of LEDs with fewer energized LEDs. With reference to FIG. 3A, levels 352, 354, 356 and 358 may correspond to the forward voltages of energized strings of LEDs up to levels 314-3, 314-2, 314-1 and 314-F, respectively. The timing of example LED array configurations A-D are shown below waveform 350. In configuration A all of the LEDs of sub-array 310A-1 are energized (i.e., up to level 314-3). In configuration B the LEDs of sub-array 310A-1 are energized up to level 314-2 and all of the LEDs of sub-array 310A-2 are energized (i.e., up to level 314-2). In configuration C the LEDs of sub-arrays 310A-1 and 310A-2 are energized up to level 314-1 and all of the LEDs of sub-array 310A-3 are energized (i.e., up to level 314-1). In configuration D the LEDs of sub-arrays 310A-1, 310A-2 and 310A-3 are energized up to level 314-F and all of the LEDs of sub-array 310A-4 are energized (i.e., up to level 314-F).

One skilled in the art will appreciate that operation of a switched LED array as described above causes individual LEDs to be switched on and off. Although such switching will often be done at a frequency high enough to avoid perception, in some situations this could result in perceptible spatial and temporal flickering of light from such an array. Accordingly, one or more diffusing elements (not shown in FIGS. 3A and 3B, see FIG. 4) may be provided to reduce or eliminate any perceived flickering.

Figure 3C:
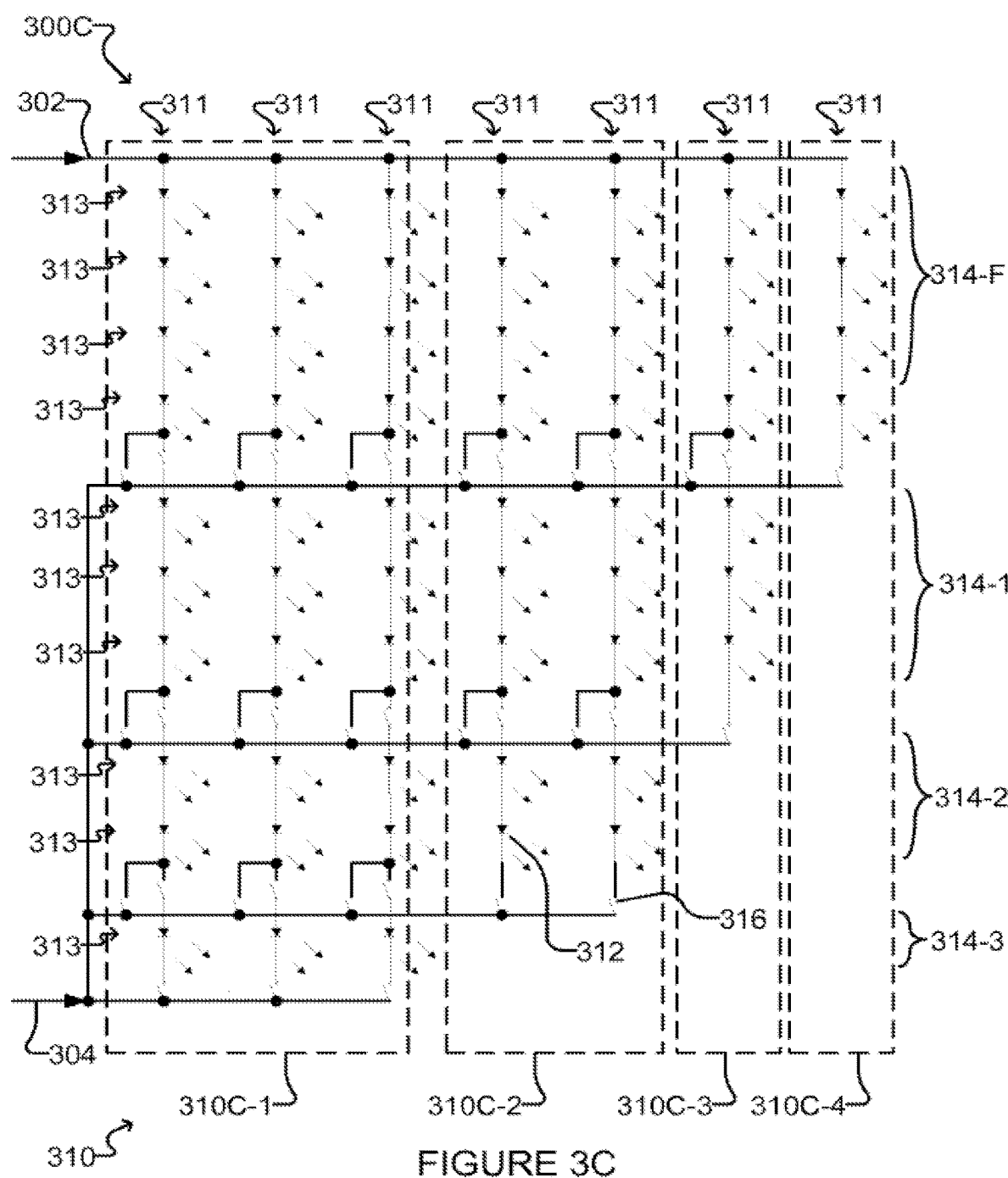
FIG. 3C shows another example switched LED array.

FIG. 3C shows an example switched LED array 300C which may be suitable for generally sinusoidally varying supply voltages. Array 300C is generally similar to array 300A of FIG. 3A, and corresponding reference characters are used to identify corresponding features. Array 300C differs from array 300A in the number of rows 313 of LEDs 312 in each level 314. In the FIG. 3C example, level 314-F has four rows of LEDs, level 314-1 has three additional rows of LEDs, level 314-2 has two additional rows of LEDs, and level 304-3 has one additional row of LEDs.

Figure 3D:
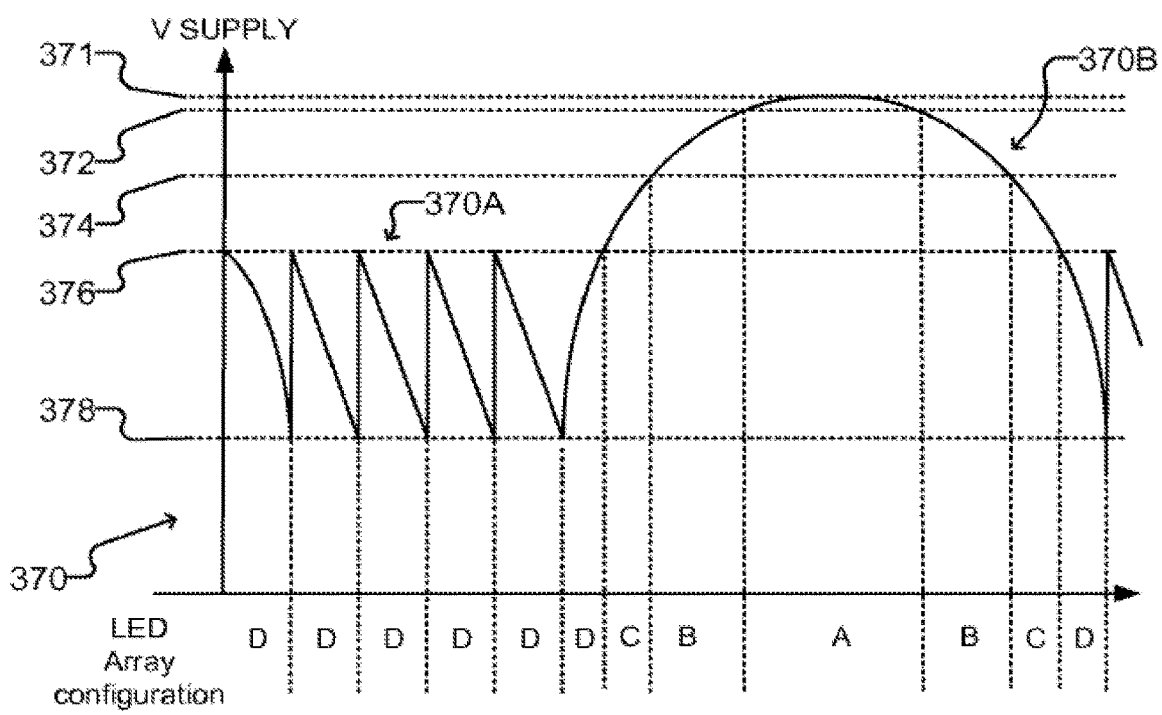
FIG. 3D shows another example supply voltage waveform for a switched LED array.

FIG. 3D shows an example LED supply voltage waveform 370 which may be suitable for powering array 300C. Waveform 370 has a sawtooth-like portion 370A and a sinusoidal portion 370B. Sawtooth-like portion 370A may be provided by a switched capacitor array wherein the capacitors are not charged to their maximum voltage and only partially discharged, such that the discharge voltage varies approximately linearly (the discharge voltage may not be exactly linear, but will generally also not be a purely capacitive discharge waveform due to load characteristics). Sinusoidal portion 370B may be provided directly from AC line voltage (for example, by closing a bypass switch such as switch 205 of FIG. 2). Sinusoidal portion 370B reaches a maximum level 371 which is within an acceptable voltage range for array 300C. Level 372 may correspond to a forward voltage of a string of LEDs in array 300C with a highest number of energized LEDs (e.g. all levels of LEDs are energized). Levels 374, 376 and 378 may likewise correspond to forward voltages of strings of LEDs with fewer energized LEDs. With reference to FIG. 3C, levels 372, 374, 376 and 378 may correspond to the forward voltages of energized strings of LEDs up to levels 314-3, 314-2, 314-1 and 314-F, respectively. The timing of example LED array configurations A-D are shown below waveform 370. In configuration A all of the LEDs of sub-array 310C-1 are energized (i.e., up to level 314-3). In configuration B the LEDs of sub-array 310C-1 are energized up to level 314-2 and all of the LEDs of sub-array 310C-2 are energized (i.e., up to level 314-2). In configuration C the LEDs of sub-arrays 310C-1 and 310C-2 are energized up to level 314-1 and all of the LEDs of sub-array 310C-3 are energized (i.e., up to level 314-1). In configuration D the LEDs of sub-arrays 310C-1, 310C-2 and 310C-3 are energized up to level 314-F and all of the LEDs of sub-array 310C-4 are energized (i.e., up to level 314-F).

Figure 3F:
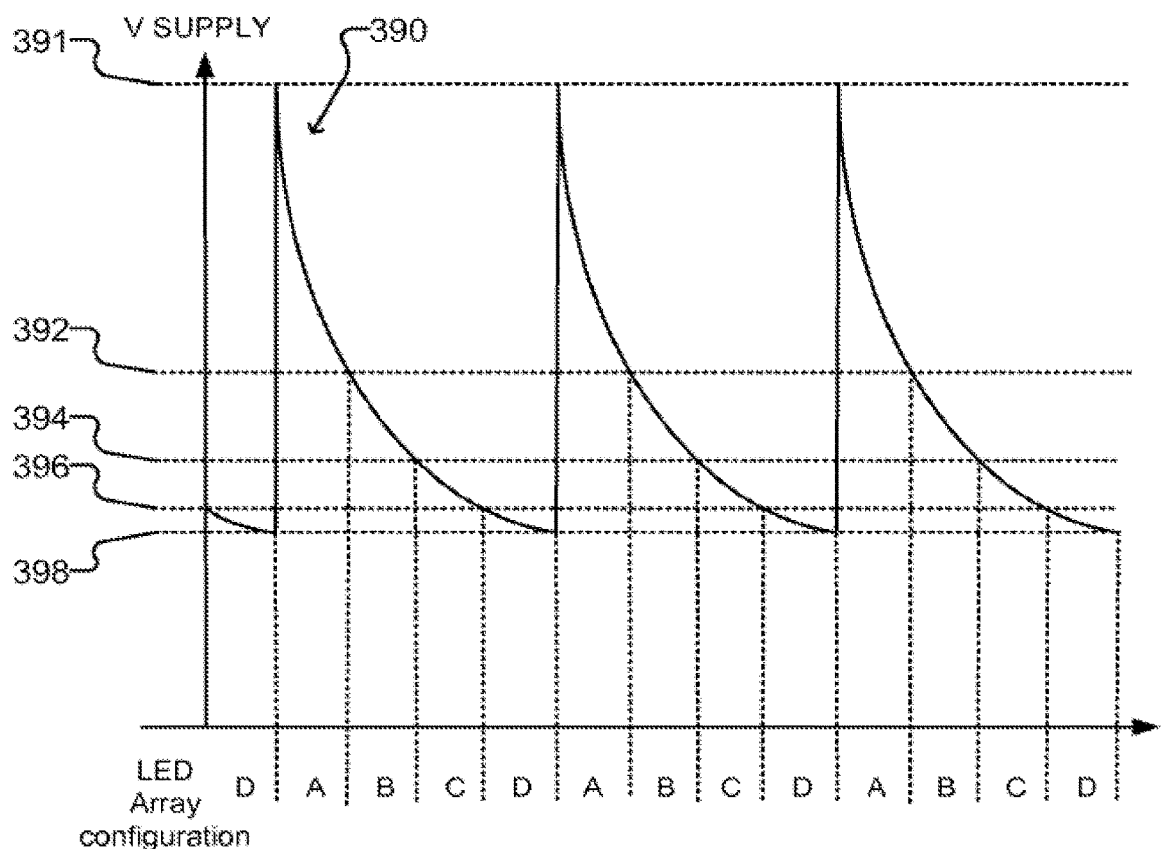
FIG. 3F shows another example supply voltage waveform for a switched LED array.
Figure 3E:
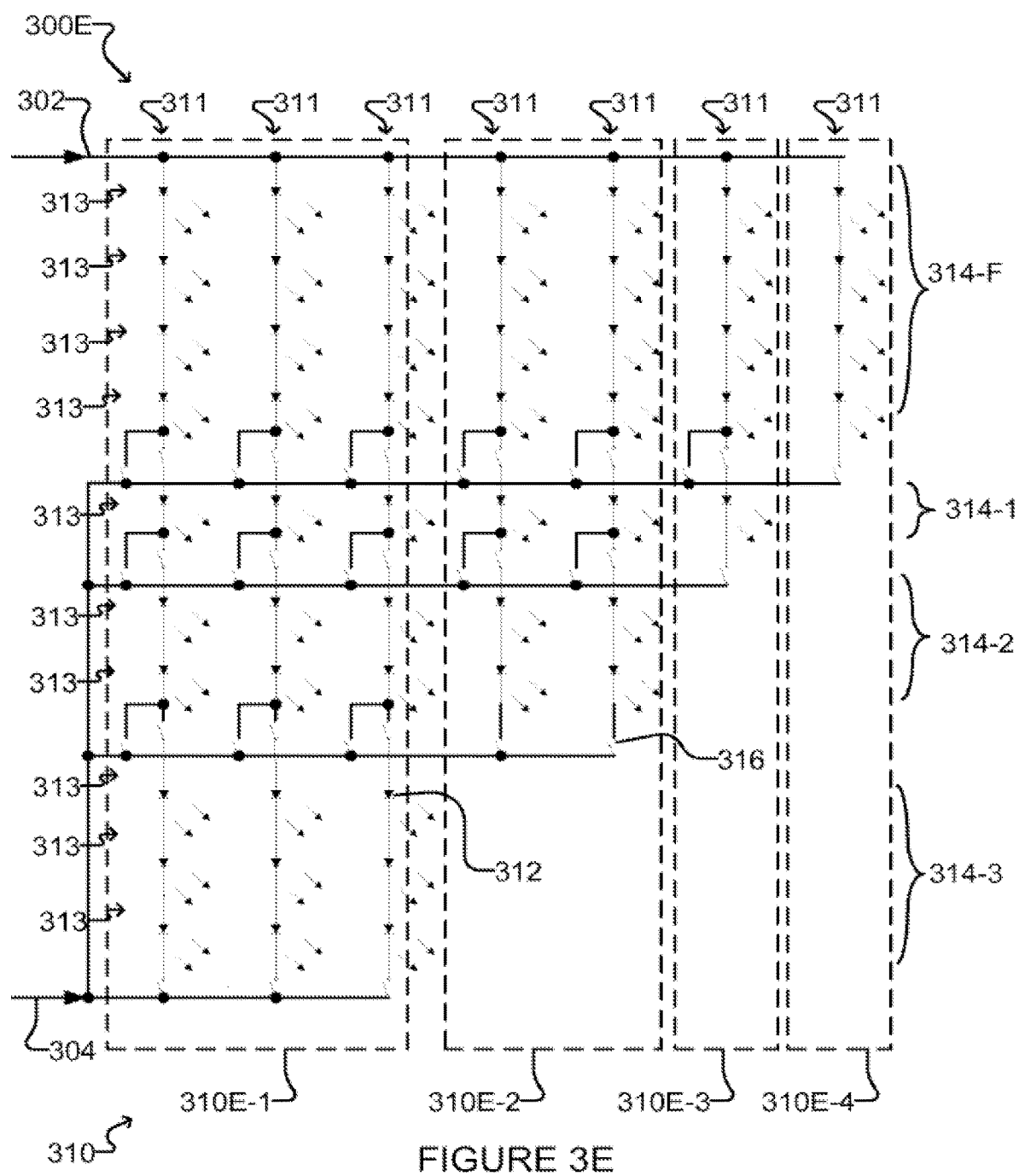
FIG. 3E shows another example switched LED array.

FIG. 3E shows an example switched LED array 300E which may be suitable for generally exponentially varying supply voltages. Array 300E is generally similar to array 300A of FIG. 3A, and corresponding reference characters are used to identify corresponding features. Array 300E differs from array 300A in the number of rows 313 of LEDs 312 in each level 314. In the FIG. 3E example, level 314-F has four rows of LEDs, level 314-1 has one additional row of LEDs, level 314-2 has two additional rows of LEDs, and level 304-3 has three additional rows of LEDs.

FIG. 3F shows an example LED supply voltage waveform 390 which may be suitable for powering array 300E. Waveform 390 may be provided by a switched capacitor array wherein the capacitors are more deeply discharged than in the above sawtooth-like examples, such that the discharge voltage varies approximately exponentially (the discharge voltage will generally not be a purely capacitive discharge waveform due to load characteristics). In some embodiments, waveform 390 is generated by sequentially connecting groups of two or more capacitors to discharge in series. Waveform 390 exponentially decays from a maximum level 391 (which is within an acceptable voltage range for array 300E), through levels 392, 394, 396 and 398, before returning to the maximum level 391. Level 392 may correspond to a forward voltage of a string of LEDs in array 300E with a highest number of energized LEDs (e.g. all levels of LEDs are energized). Levels 394, 396 and 398 may likewise correspond to forward voltages of strings of LEDs with fewer energized LEDs. With reference to FIG. 3E, levels 392, 394, 396 and 398 may correspond to the forward voltages of energized strings of LEDs up to levels 314-3, 314-2, 314-1 and 314-F, respectively. The timing of example LED array configurations A-D are shown below waveform 390. In configuration A all of the LEDs of sub-array 310E-1 are energized (i.e., up to level 314-3). In configuration B the LEDs of sub-array 310E-1 are energized up to level 314-2 and all of the LEDs of sub-array 310E-2 are energized (i.e., up to level 314-2). In configuration C the LEDs of sub-arrays 310E-1 and 310E-2 are energized up to level 314-1 and all of the LEDs of sub-array 310E-3 are energized (i.e., up to level 314-1). In configuration D the LEDs of sub-arrays 310E-1, 310E-2 and 310E-3 are energized up to level 314-F and all of the LEDs of sub-array 310E-4 are energized (i.e., up to level 314-F).

Figure 4:
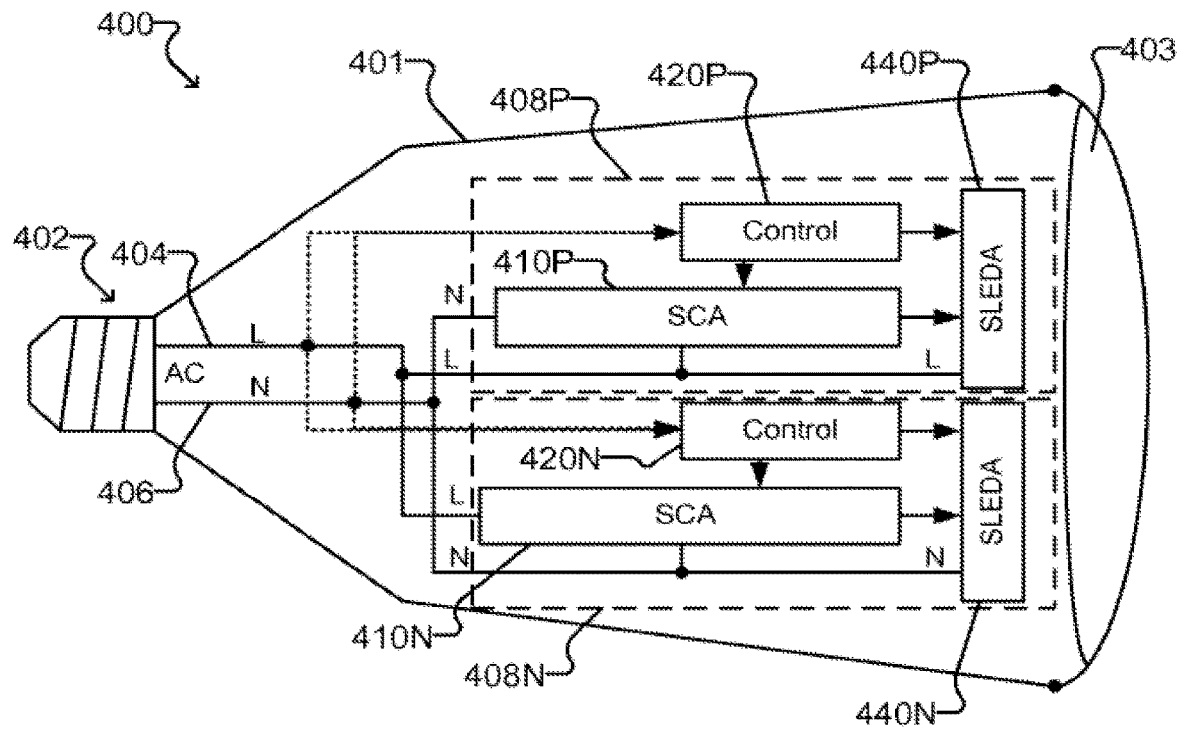
FIG. 4 shows an example LED lighting fixture with a first block and a second block according to one embodiment.

FIG. 4 shows an example lighting apparatus 400 wherein switched capacitor arrays supply power to switched LED arrays. Apparatus 400 comprises a housing 401 which may conform to one of a variety of standard lighting formats (e.g., MR16, PAR20, PAR30, PAR38, PAR40, or other formats). Apparatus 400 has an input 402 connectable to an AC power source (not shown), with a live line 404 and a neutral line 406 configured to be connected directly to the AC mains. In the FIG. 4 example, identical first and second blocks, which may be referred to as "positive" and "negative" wave blocks 408P and 408N, respectively, are provided, each comprising a switched capacitor array 410P/N, a control system 420P/N, and a switched LED array 440P/N. Apparatus 400 may also comprise a diffusing element 403 to reduce or eliminate any perceived flickering of switched LED arrays 440P and 440N as individual LEDs are switched on and off, as described above. Although the terms "positive" and "negative" are used, it is to be understood that blocks 408P and 408N are not polarized, and may be identically, or substantially identically, constructed. Providing identical blocks for the positive and negative waves may result in lower cost and improved simplicity of manufacture in some situations. Also, in some embodiments, providing a lighting apparatus with substantially identical positive and negative wave blocks may avoid the need for grounding or voltage isolation.

In positive wave block 408P, capacitor array 410P and LED array 440P are both connected directly to live line 404, and LED array 440P is coupled to neutral line 406 through capacitor array 410P. Conversely, in negative wave block 408N, capacitor array 410N and LED array 440N are both connected directly to neutral line 406, and LED array 440N is coupled to live line 404 through capacitor array 410N. Positive capacitor array 410P may be controlled to receive only the positive half wave of an AC input voltage by opening input switches (not shown in FIG. 4) to array 410P during the negative half wave. The input switches opened to ensure that capacitor array 410P receives only the positive half wave of an AC input voltage may comprise, for example, switches for charging the individual capacitors of array 410P (e.g., switches $S_{IX}$ of FIG. 2, as described below) or an input switch for the entire array 410P (e.g., switch 609 of FIG. 6, as described below). Likewise, negative capacitor array 410N may be controlled to receive only the negative half wave of an AC input voltage by opening input switches to array 410N during the positive half wave.

Control system 420P is configured to selectively operate the switches of capacitor array 410P and LED array 440P, and control system 420N is configured to selectively operate the switches of capacitor array 410N and LED array 440N as described herein. In some embodiments, control systems 420P and 420N may be substantially identical. In some embodiments, the functionalities of control systems 420P and 420N may be combined into a single combined control system (not shown) for controlling all of the capacitor and LED arrays, but such a combined control system may require significant amounts of voltage isolation and be impractical in some situations.

Figure 4A:
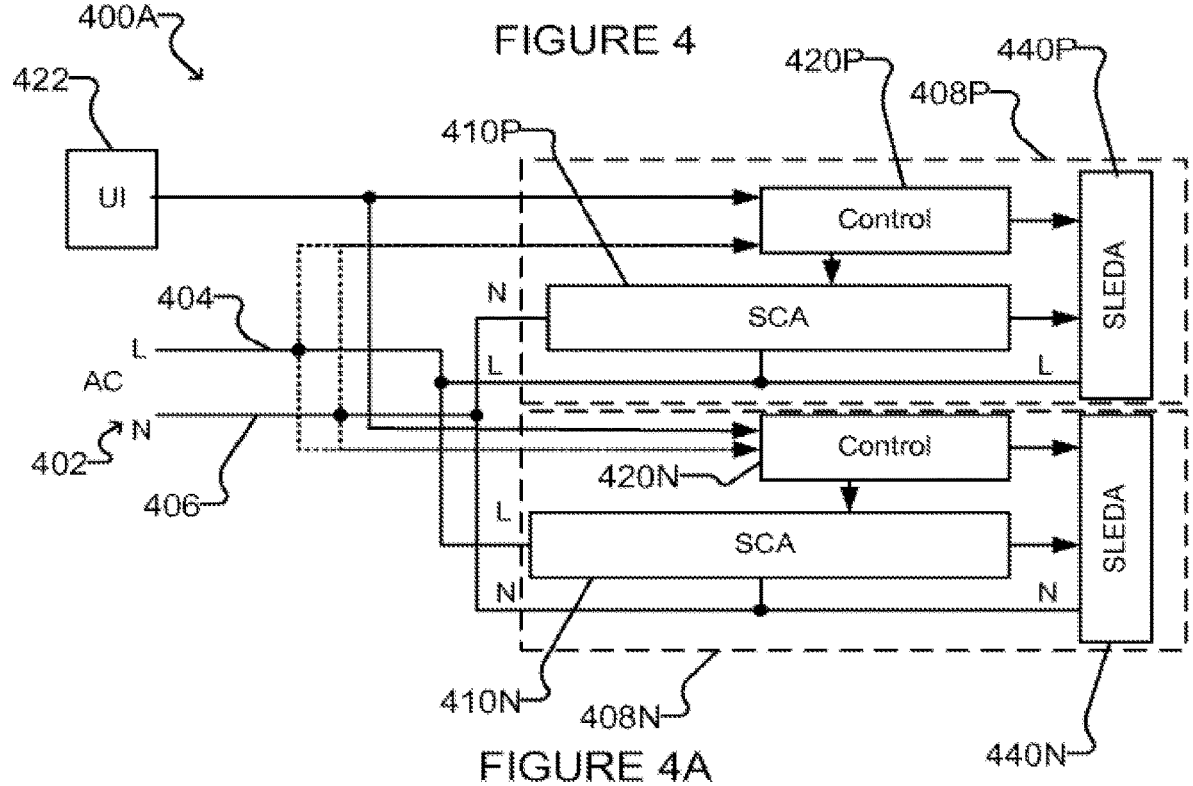
FIG. 4A shows the LED lighting fixture similar of FIG. 4 configure to receive control signals from an alternate user interface.

FIG. 4A shows a lighting apparatus 400A similar to apparatus 400 of FIG. 4, except that in apparatus 400A control systems 420P and 420N receive control information from an analog or digital user interface 422. The information may, for example specify a desired brightness and/or color of light output from apparatus 400A.

Figure 4B:
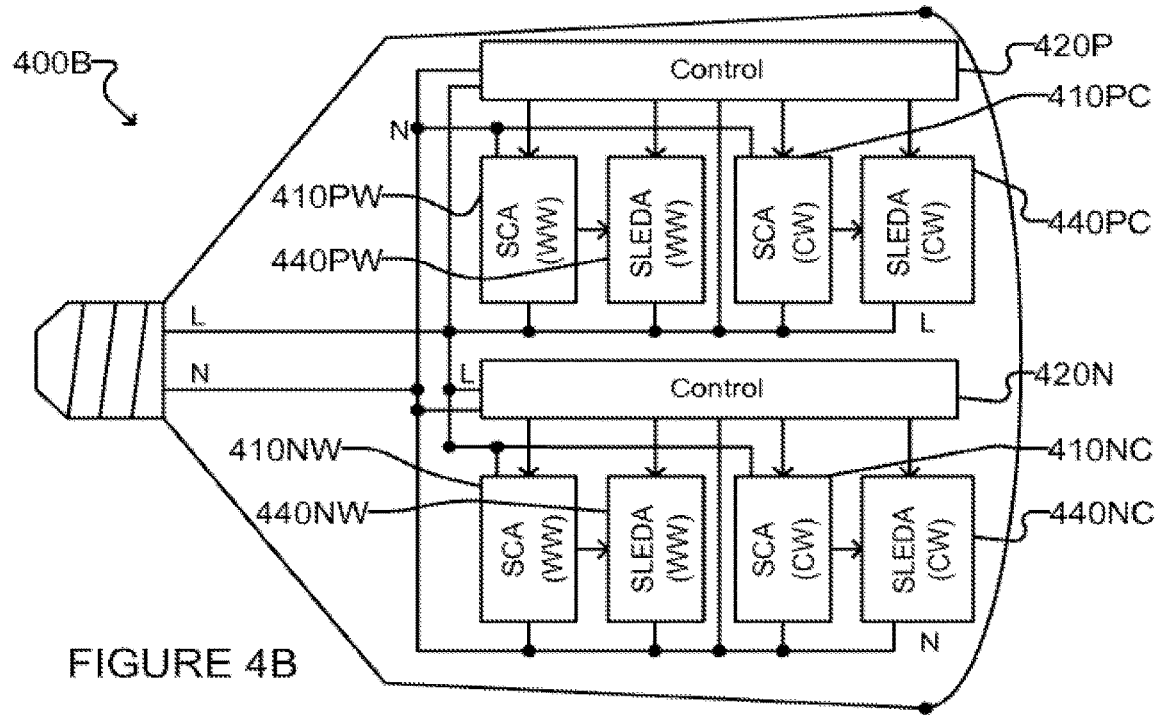
FIGS. 4B-E show other example LED lighting fixtures.
Figure 4C:
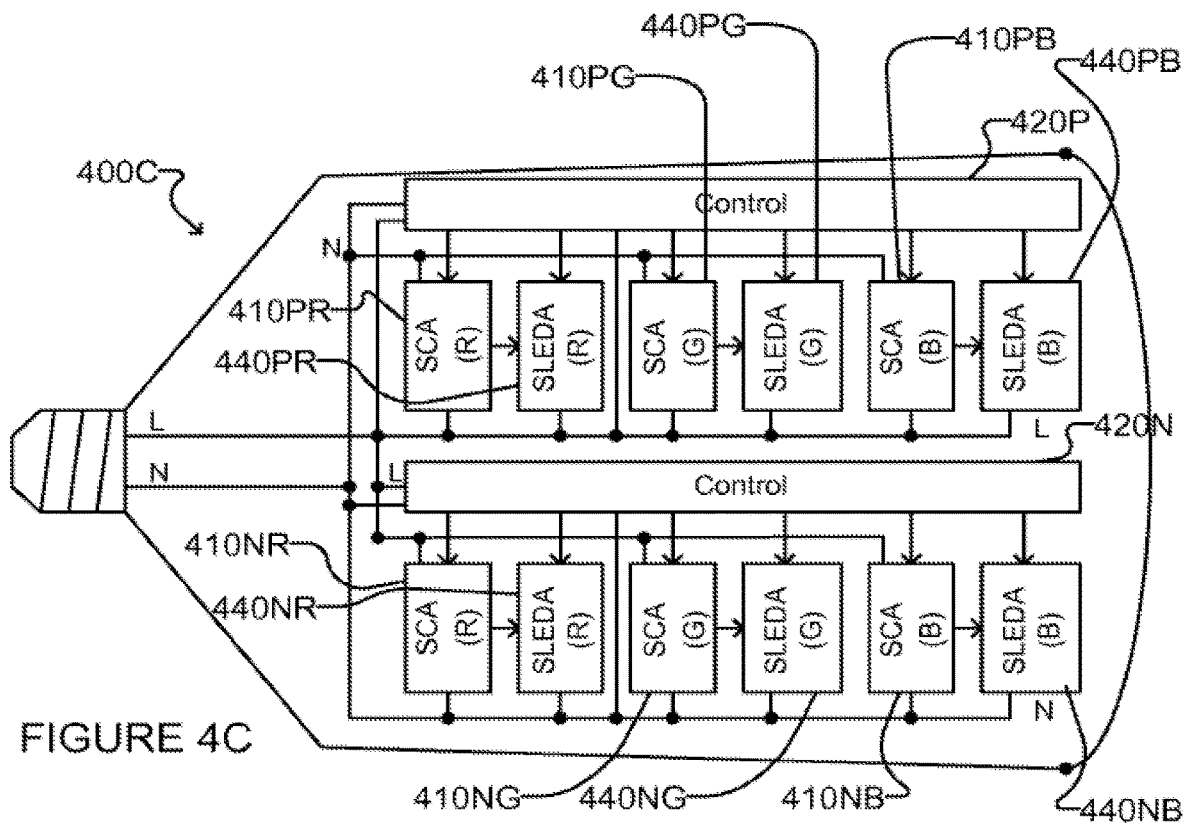

FIGS. 4B and 4C show lighting apparatus 400B and 400C, respectively. In apparatus 400B each of the positive and negative wave blocks comprises two LED arrays 440PW, 440PC, 440NW, 440NC of different colors (e.g., cold white and warm white), each having an associated switched capacitor array 410PW, 410PC, 410NW, 410NC. In apparatus 400C each of the positive and negative wave blocks comprises three LED arrays 440PR, 440PG, 440PB, 440NR, 440NG, 440NB of different colors (e.g., red, green and blue), each having an associated switched capacitor array 410PR, 410PG, 410PB, 410NR, 410NG, 410NB.

Figure 4D:
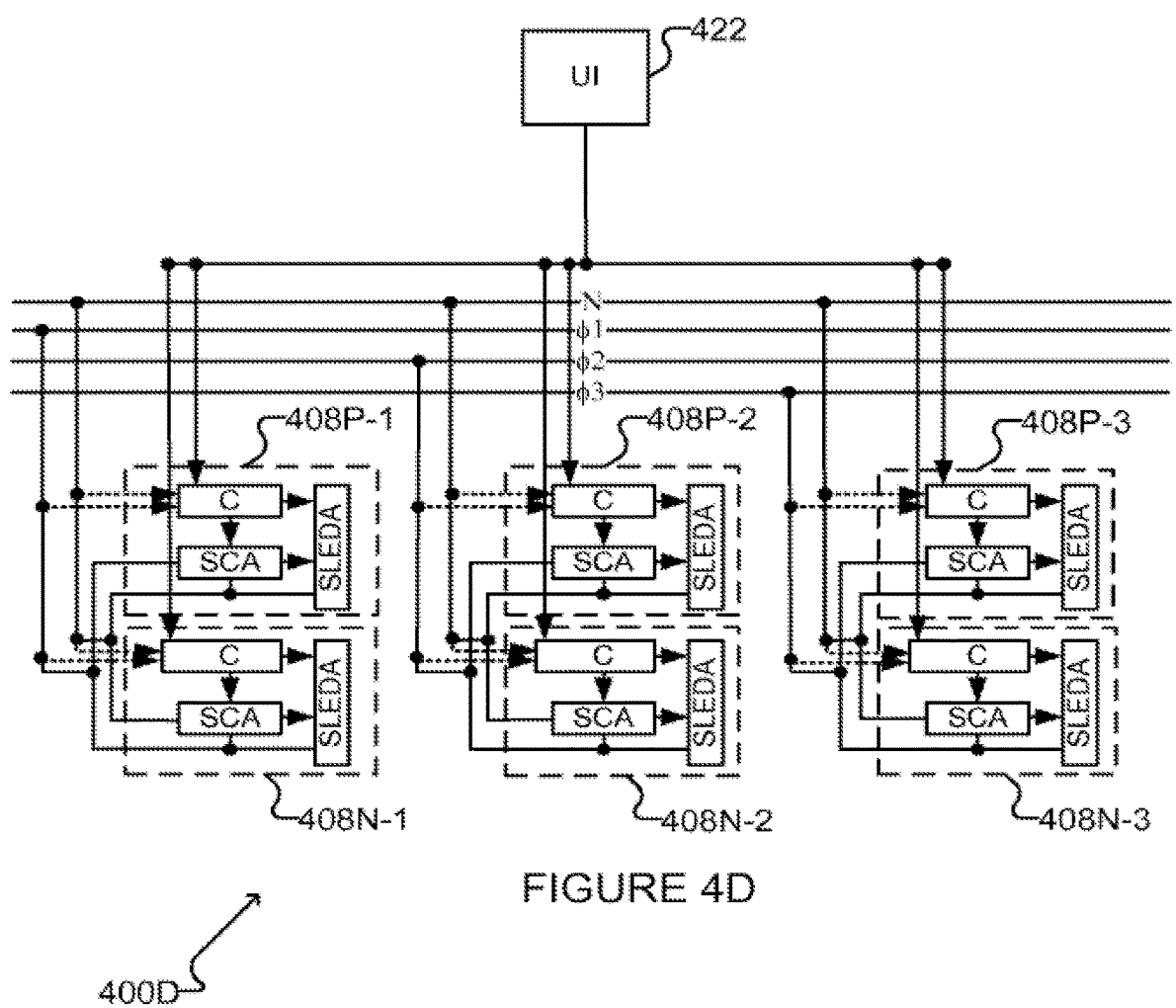
Figure 4E:
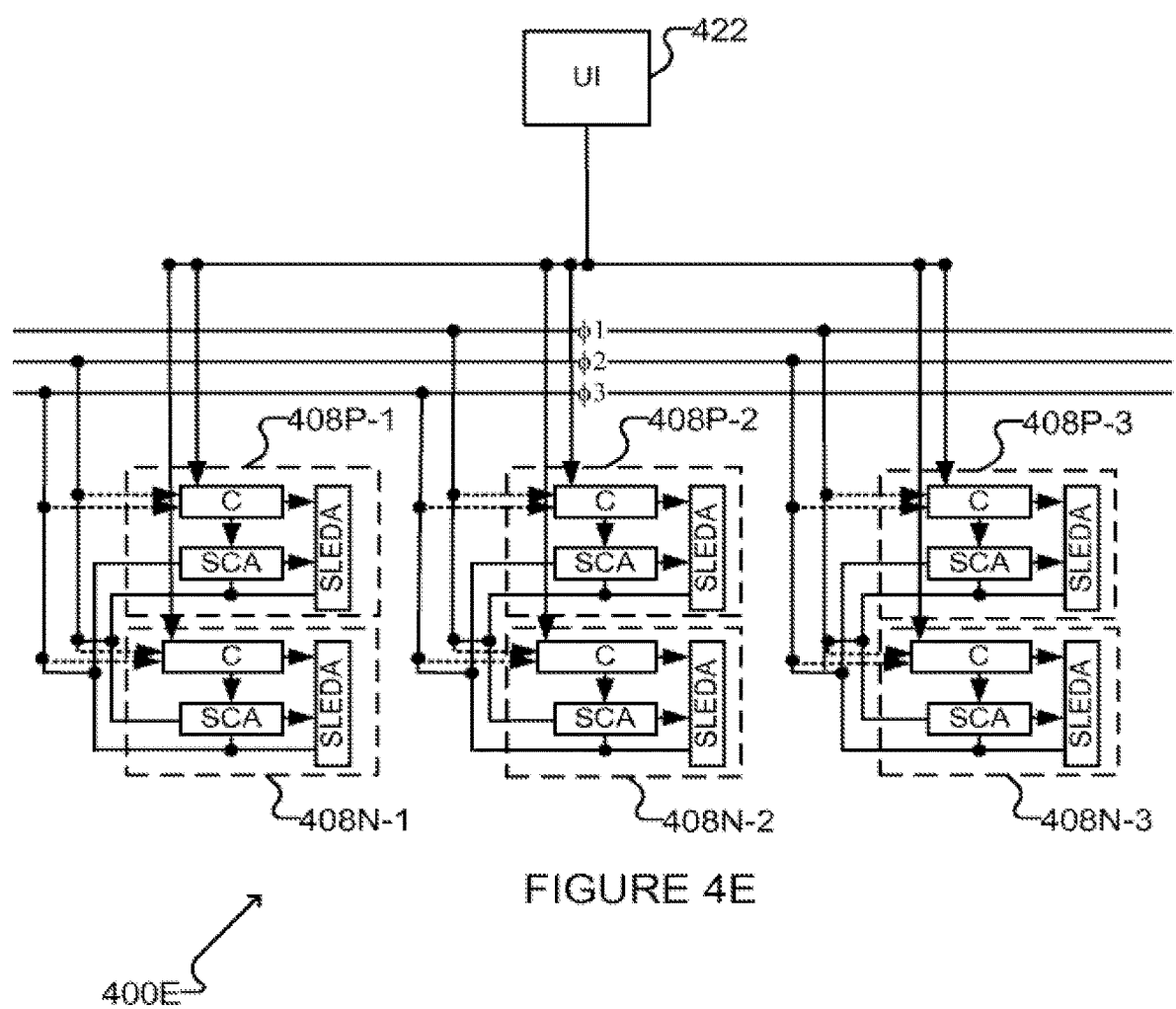

FIG. 4D shows a lighting apparatus 400D for connecting to a "Y"-type three phase AC power supply, comprising three lines φ1, φ2 and φ3 and a neutral N. Apparatus 400D comprises three positive wave blocks 408P-1, 408P-2 and 408P-3, and three negative wave blocks 408N-1, 408N-2 and 408N-3 each of which is identical to the corresponding positive and negative wave blocks 408P and 408N discussed above with respect to FIG. 4. Blocks 408P-1 and 408N-1 are connected across line φ1 and neutral N, blocks 408P-2 and 408N-2 are connected across line φ2 and neutral N, and blocks 408P-3 and 408N-3 are connected across line φ3 and neutral N. In the FIG. 4D example, apparatus 400D is shown as connecting to a "Y"-type three phase AC power supply, but it is to be understood that apparatus 400D could also be connected to a "delta"-type three phase AC power supply (without a neutral), for example by connecting blocks 408P-1 and 408N-1 across lines φ2 and φ3, blocks 408P-2 and 408N-2 across lines φ1 and φ3, and blocks 408P-3 and 408N-3 across lines φ1 and φ2, as shown in FIG. 4E which illustrates example apparatus 400E. As in the FIG. 4A example, the control systems of apparatus 400D and apparatus 400E may receive control information from analog or digital user interfaces 422.

Figure 4F:
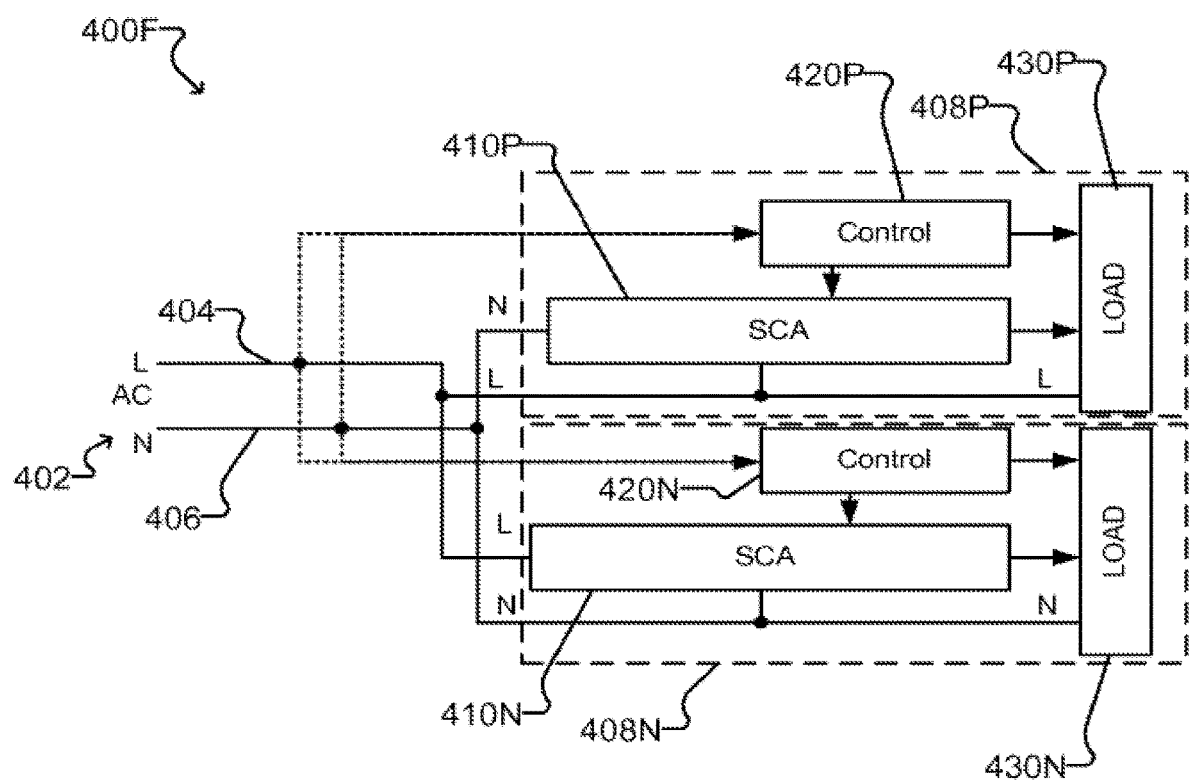
FIG. 4F shows another example apparatus with first and second blocks.

The examples of FIGS. 4-4E discussed above show positive and negative wave blocks 408P and 408N which comprise switched LED arrays. As one skilled in the art will appreciate, the positive and negative wave block architecture may also be employed to power other light sources, or any other type of load. FIG. 4F shows an example apparatus 400F wherein positive and negative wave blocks 408P and 408N respectively comprise loads 430P and 430N. Loads 430P and 430N may comprise any type of load having any sort of voltage, current or power requirements.

Figure 5A:
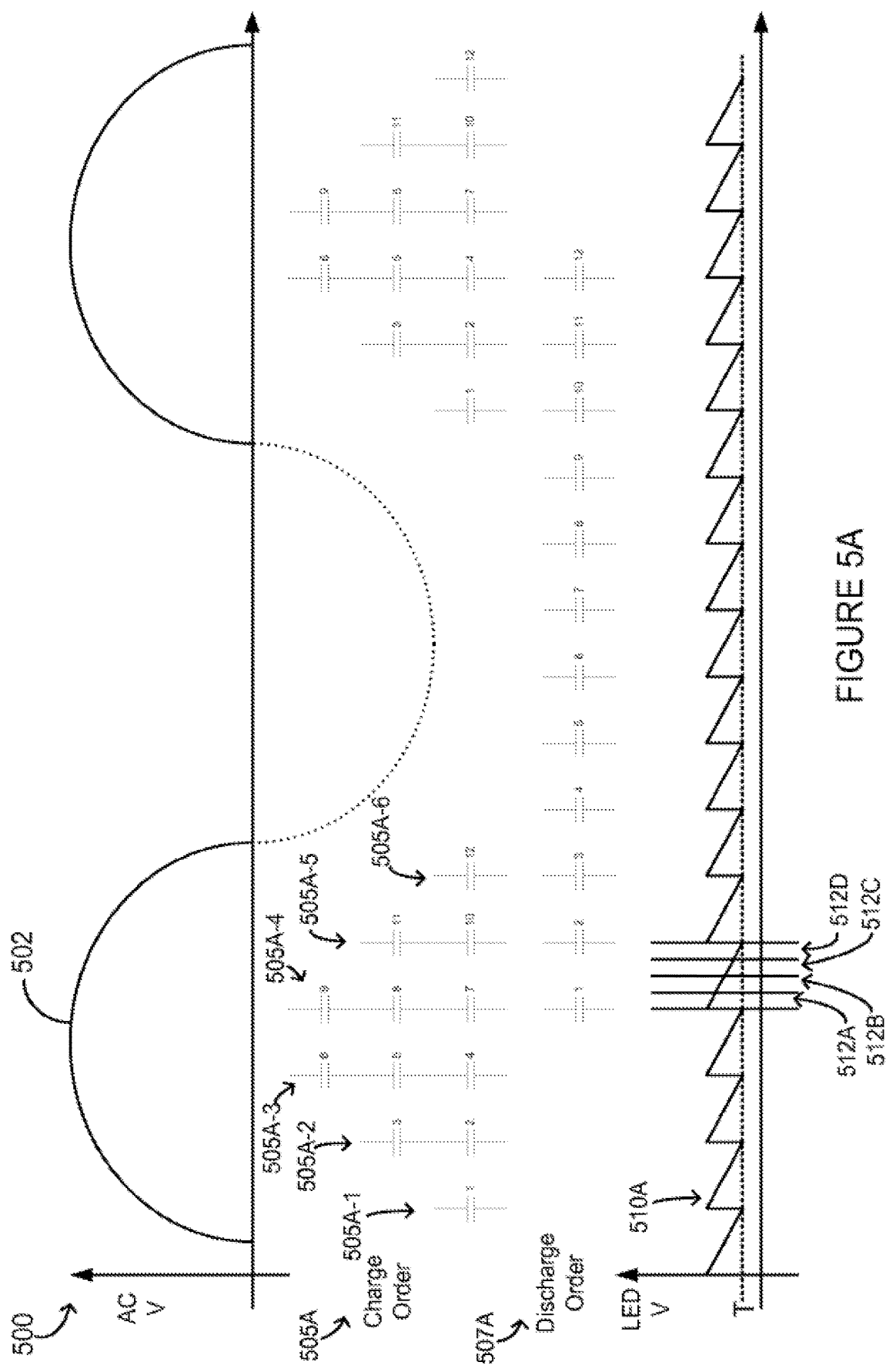
FIGS. 5A-C are voltage and charging graphs for high, medium, and low voltage sinusoidal AC input voltage examples.
Figure 5B:
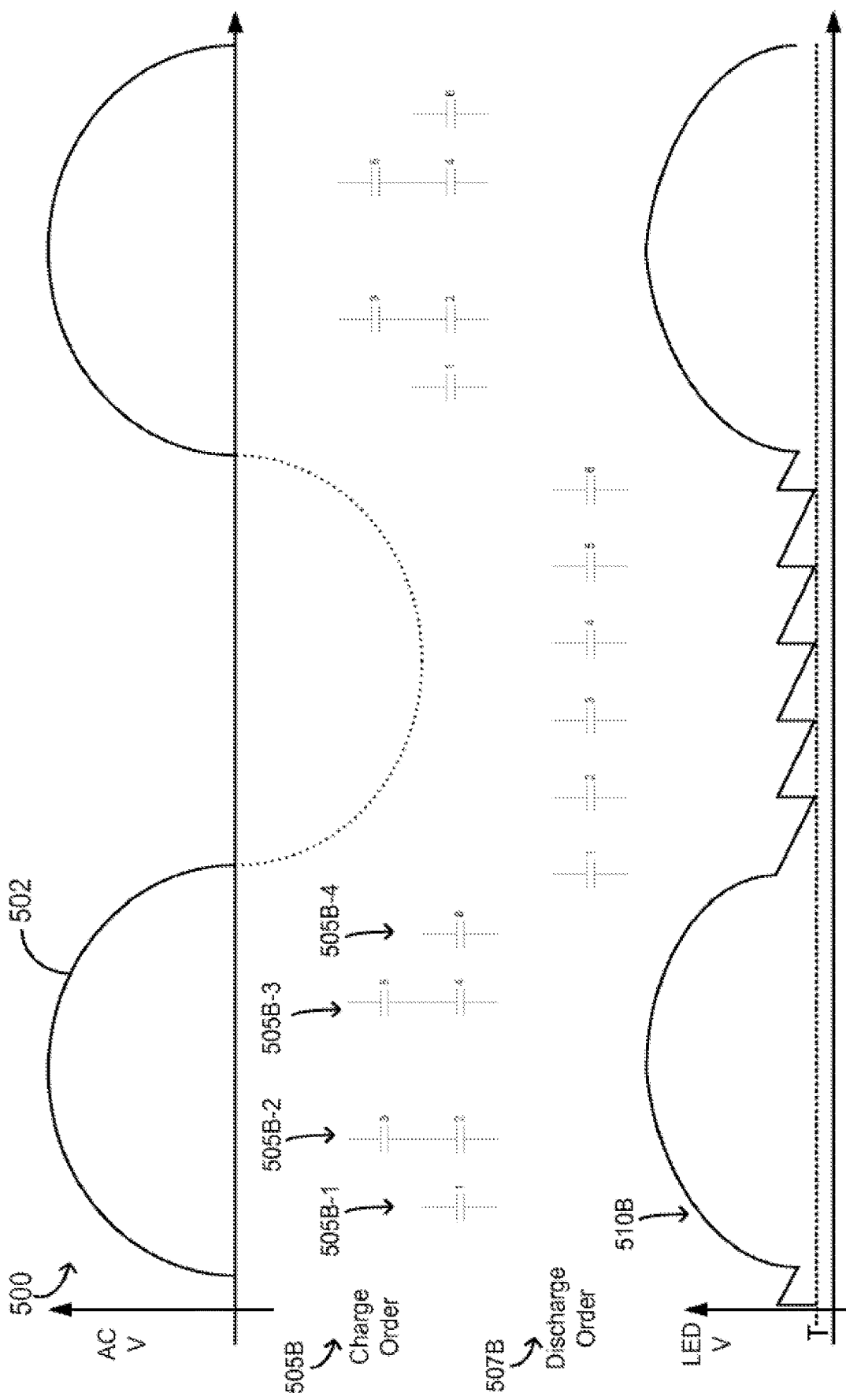
Figure 5C:
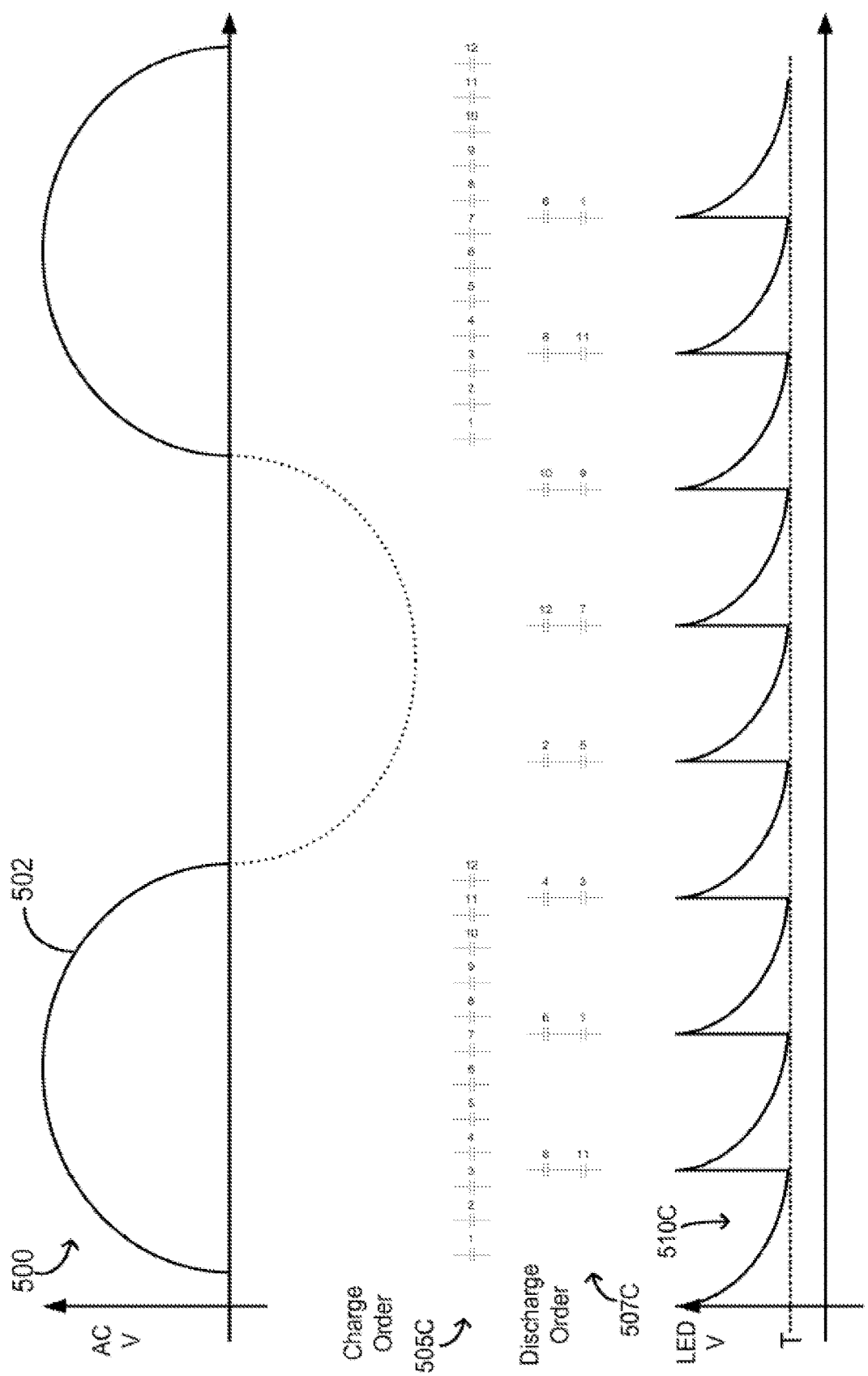

FIGS. 5A-C show charging and discharging orders and voltage graphs of example switched capacitor arrays powering example switched LED arrays for high (e.g. having a peak voltage of over 48V), medium (e.g. having a peak voltage of 9-48V), and low (e.g. having a peak voltage below 9V) voltage sinusoidal AC input voltage examples, respectively. In each of FIGS. 5A-C, the top graph shows a sinusoidal AC input voltage 500, with one half of the waveform indicated in a dotted line, to indicate that the switched capacitor array only receives one half 502 of the AC input waveform (either the positive or the negative half). Below the AC input voltage a charging graph 505 and a discharging graph 507 respectively show charging and discharging orders of capacitors of the switched capacitor array. The bottom graph shows the voltage provided to the switched LED array.

In the FIG. 5A example, a first branch 505A-1 comprising one capacitor is charged during an initial portion of the half wave, until that capacitor reaches a desired voltage (which is typically less than the maximum voltage for that capacitor). Once the first branch is charged, a second branch 505A-2 comprising two capacitors in series is charged until those capacitors each reach the desired voltage. This process is repeated for branches 505A-3, 505A-4, 505A-5 and 505A-6, comprising series connected strings of three, three, two and one capacitor, respectively. The capacitor from the first branch 505A-1 begins discharging as branch 505A-4 is charging, and discharges, thereby providing power to the switched LED array, until the voltage provided drops to a threshold level T. At that point the capacitors from the second branch 505A-2 are discharged, one at a time until the provided voltage drops to T, followed by the capacitors of the subsequent branches. Thus, the switched LED array may be provided with a generally descending sawtooth-like input voltage, as indicated by waveform 510A. In some embodiments, the sawtooth-like input voltage may be periodic and have a frequency of about 720 Hz. The discharge order may be varied from the order shown in the illustrated example, as long as sufficient time is provided between charging and discharging of each capacitor for the associated switches to be switched from charging to discharging configurations, and as long as an uncharged capacitor, or a capacitor currently being charged, is not selected for discharging. Also, in some embodiments, one or more capacitors or branches of capacitors may be disabled (and thus removed from the charging and discharging orders) to provide power factor correction, as described below.

The switched LED array may be controlled to account for the changing input voltage. For example, during a first portion 512A of each descending sawtooth, the LED array may be configured to connect a first number of strings of LEDs in parallel across the input voltage, each string having a first number of LEDs connected in series. During a second portion 512B the LED array may be configured to connect a second number of strings in parallel across the input voltage, each string having a second number of LEDs connected in series, with the second number of strings being greater than the first number of strings and the second number of LEDs being less than the first number of LEDs, to maintain the current through the LEDs within a desired range. Similarly, the number of strings may be increased and the number of LEDs per string may be decreased in subsequent periods 512C and 512D to maintain desired current levels through the LEDs.

In the FIG. 5B example, the input AC voltage never exceeds a maximum desired voltage for the switched LED array, so for the portion of the input AC exceeding the threshold level T, the LED array is powered directly from the AC input voltage, as indicated by waveform 510B. As shown in charging chart 505B, branches 505B-1 to 505B-4 are connected for charging across the input voltage during an upper portion of the input AC half wave. As shown in discharging chart 507B, capacitors are only discharged when the input AC voltage drops to near T.

In the FIG. 5C example, since the input AC voltage is relatively low, the capacitors are charged one at a time, as indicated by charging chart 505C. As shown discharging chart 507C, the capacitors are discharged two at a time by connecting the discharging capacitors in series across the output of the switched capacitor array. As indicated by waveform 510C, the LED array is provided with voltage that decays exponentially.

Figure 6:
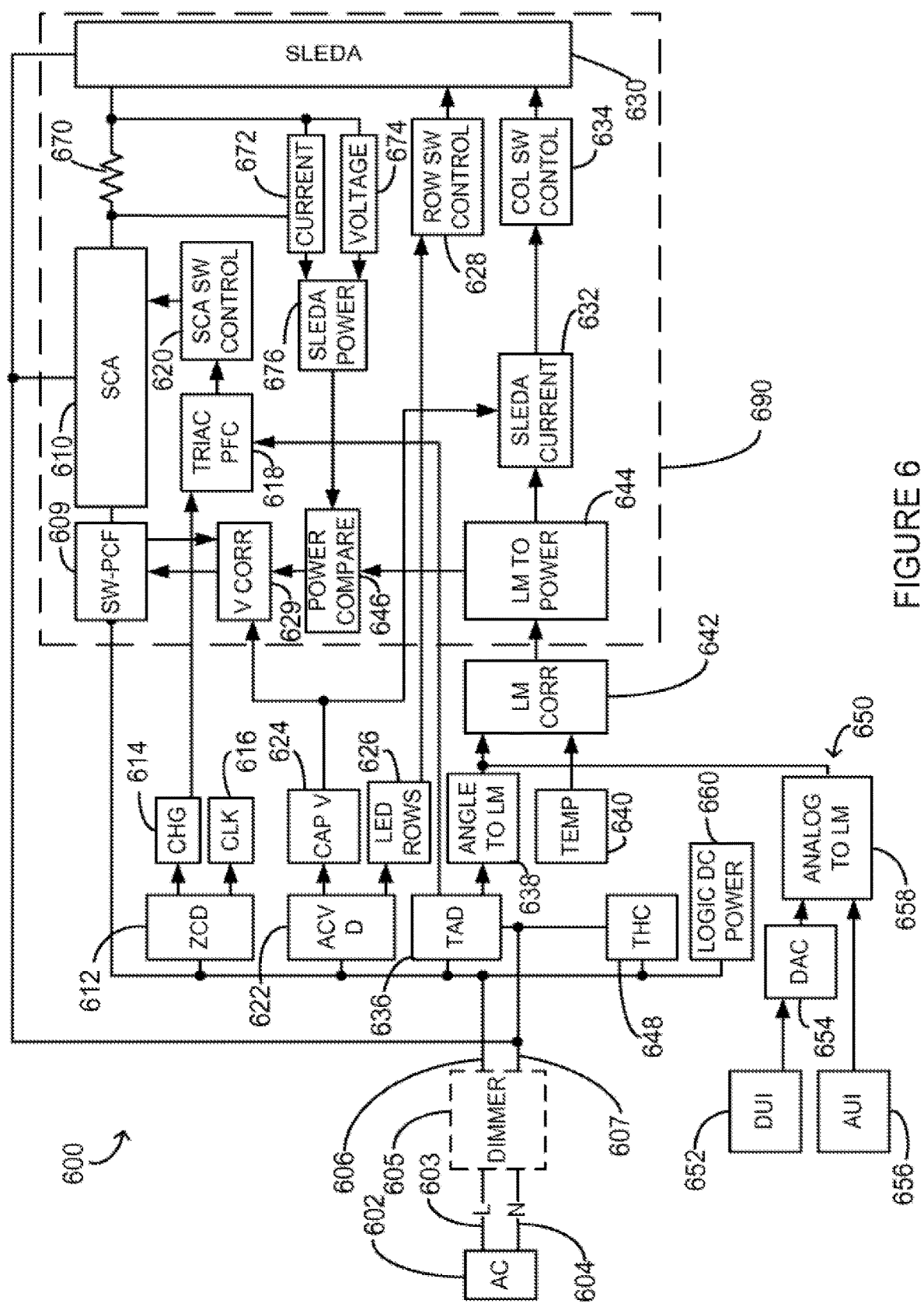
FIG. 6 shows an example control system for a switched capacitor array and a switched LED array.

FIG. 6 shows an example control system 600 for a switched capacitor and a switched LED array. An AC power source 602 provides a sinusoidal input voltage to live and neutral lines 603 and 604. A dimmer 605 may optionally be provided (as indicated by the dashed lines showing dimmer 605) along lines 603 and 604. When present, dimmer 605 is operable by a user to selectively reduce the power provided in lines 603 and 604 (typically by cutting out a variable leading or trailing portion of each half wave through use of a TRIAC or the like), and the dimmer-modulated AC voltage is provided to lines 606 and 607. When no dimmer is present, the sinusoidal AC input voltage is provided directly to lines 606 and 607.

Line 606 is connected to provide charging current to a switched capacitor array (SCA) 610 through an input switch 609. Input switch 609 also comprises a current limiter which prevents the current passing therethrough from exceeding a predetermined maximum current. For example, the current through switch 609 may be monitored, and switch 609 may be opened when the current approaches the predetermined maximum current. In some embodiments, the current through switch 609 may be monitored using an internal resistance of switch 609 (such as, for example, Rds of a MOSFET switch), or some other current monitoring resistor. The predetermined maximum current may be based, for example, on the internal resistance of switch 609 and the maximum charge current for the capacitors of SCA 610. SCA 610 is controlled to provide an output voltage to a switched LED array (SLEDA) 630 through a resistor 670, as described below.

Line 606 is also connected to a zero crossing detection block 612, an AC voltage detection block 622, TRIAC angle detection block 636, a TRIAC holding current block 648, and a logic DC power block 660. Line 607 is connected to TRIAC angle detection block 636, TRIAC holding current block 648, SCA 610 and SLEDA 630. TRIAC holding current block 648 is configured to selectively draw additional current from lines 606 and 607, such that at least a target holding current is always drawn through dimmer 605 to maintain proper dimmer operation.

Zero crossing detection block 612 detects the voltage in line 606 transitioning from negative to positive (and vice versa) and provides a signal indicating the zero crossing time to a charge enable block 614 and a timing block 616 which provides timing information to other blocks of system 600, either directly or through one or more system clocks. Charge enable block 614 provides a charge enable signal to a TRIAC power factor correction (PFC) block 618. When a dimmer is present, TRIAC PFC block 618 also receives a signal indicating a detected phase cut angle from TRIAC angle detection block 636. TRIAC PFC block 618 provides charge enable and power factor correction information to a SCA switch control block 620 to control the charging and discharging of the capacitors of SCA 610. SCA switch control block 620 in turn is configured to sequentially select individual branches of capacitors of SCA for charging based on the charge enable and power factor correction information, and connects the selected branch between switch 609 and line 607 to receive the input voltage. SCA switch control block 620 may, for example, connect the selected branch to switch 609 before switch 609 is closed, such that the selected branch is ready for charging in advance of the actual charging time. SCA switch control block 620 is also configured to sequentially connect charged capacitors (either one at a time or in series-connected groups of equal numbers) between SLEDA 630 (through resistor 670) and line 607 for discharging.

AC voltage detection block 622 detects the peak voltage on line 606 and provides peak voltage information to a capacitor charge voltage block 624 and a LED row number block 626. Capacitor charge voltage block 624 determines a target voltage to which the capacitors of SCA 610 are to be charged, and provides the target voltage to a voltage correction block 629 and a SLEDA current block 632. LED row number block 626 determines a desired number of rows of LEDs to be energized in SLEDA 630 based on the target voltage, and provides the desired number of rows to SLEDA row switch control block 628. SLEDA row switch control block 628 in turn controls the switches of SLEDA to energize a number of LEDs equal to the desired number of rows in each active string of LEDs.

When a dimmer is present, TRIAC angle detection block 636 detects a phase cut angle caused by operation of dimmer 605, and provides the detected phase cut angle to TRIAC PFC block 618 (as discussed above) and an angle to luminance conversion block 638. Angle to luminance conversion block 638 determines a desired luminance based on the phase cut angle. Angle to luminance conversion block 638 may, for example, apply an exponential conversion. Angle to luminance conversion block 638 provides the desired luminance to a luminance correction block 642. When no dimmer is present, the desired luminance may be set to a nominal luminance. Luminance correction block 642 also receives a temperature signal from a temperature sensor 640, and applies a correction to the desired luminance based on the temperature signal. Temperature sensor 640 may, for example, be positioned near a heat sink (not shown) for SLEDA 630.

Luminance correction block 642 may alternatively receive the desired luminance from an alternate user interface system 650. System 650 typically comprises either a digital user interface 652 and a digital to analog converter 654, or an analog user interface 656, which provides an analog control signal to an analog to luminance conversion block 658. Analog to luminance conversion block 658 determines the desired luminance based on the analog control signal, and provides the desired luminance to luminance correction block 642. In some embodiments, when a desired luminance is received from both angle to luminance conversion block 638 and analog to luminance conversion block 658, the desired luminance from angle to luminance conversion block 638 takes precedence.

Luminance correction block 642 provides a corrected luminance to a luminance to power conversion block 644. Luminance to power conversion block 644 determines a desired power corresponding to the corrected luminance, and provides the desired power to a power comparison block 646, and to SLEDA current block 632.

SLEDA current block 632 uses the desired power received from luminance to power conversion block 644 and the target voltage received from capacitor charge voltage block 624 to determine a desired current to be drawn by SLEDA 630. SLEDA current block 632 provides the desired current and the target voltage to a SLEDA column switch control block 634. SLEDA column switch control block 634 determines a desired number of columns based on the desired current and the target voltage and operates the switches of SLEDA 630 to activate a number strings of LEDs equal to the desired number of columns.

A current detection block 672 and a voltage detection block 674 respectively detect current and voltage being provided from SCA 610 to SLEDA 630 through resistor 670, and provide the detected current and voltage to a SLEDA power block 676. SLEDA power block 676 determines the actual power being delivered to SLEDA 630, and provides the actual power to power compare block 646. Power compare block 646 compares the actual power received from SLEDA power block 676 to the desired power received from luminance to power conversion block 644, and provides the power comparison results to voltage correction block 629. Voltage correction block 629 determines a corrected target voltage based on the target voltage received from capacitor charge voltage block 624 and the power comparison received from power compare block 646. Voltage correction block 629 also receives information indicating the input voltage level from switch 609, and uses the input voltage level and the corrected target voltage to control the operation of input switch 609 to charge the selected branch of capacitors of SCA 610.

By monitoring both the actual current and voltage provided to SLEDA 630 (by blocks 672 and 674), and using the corresponding power to control the charging of capacitors in SCA 610, control system 600 thus provides power-based control of SLEDA 630.

Figure 6A:
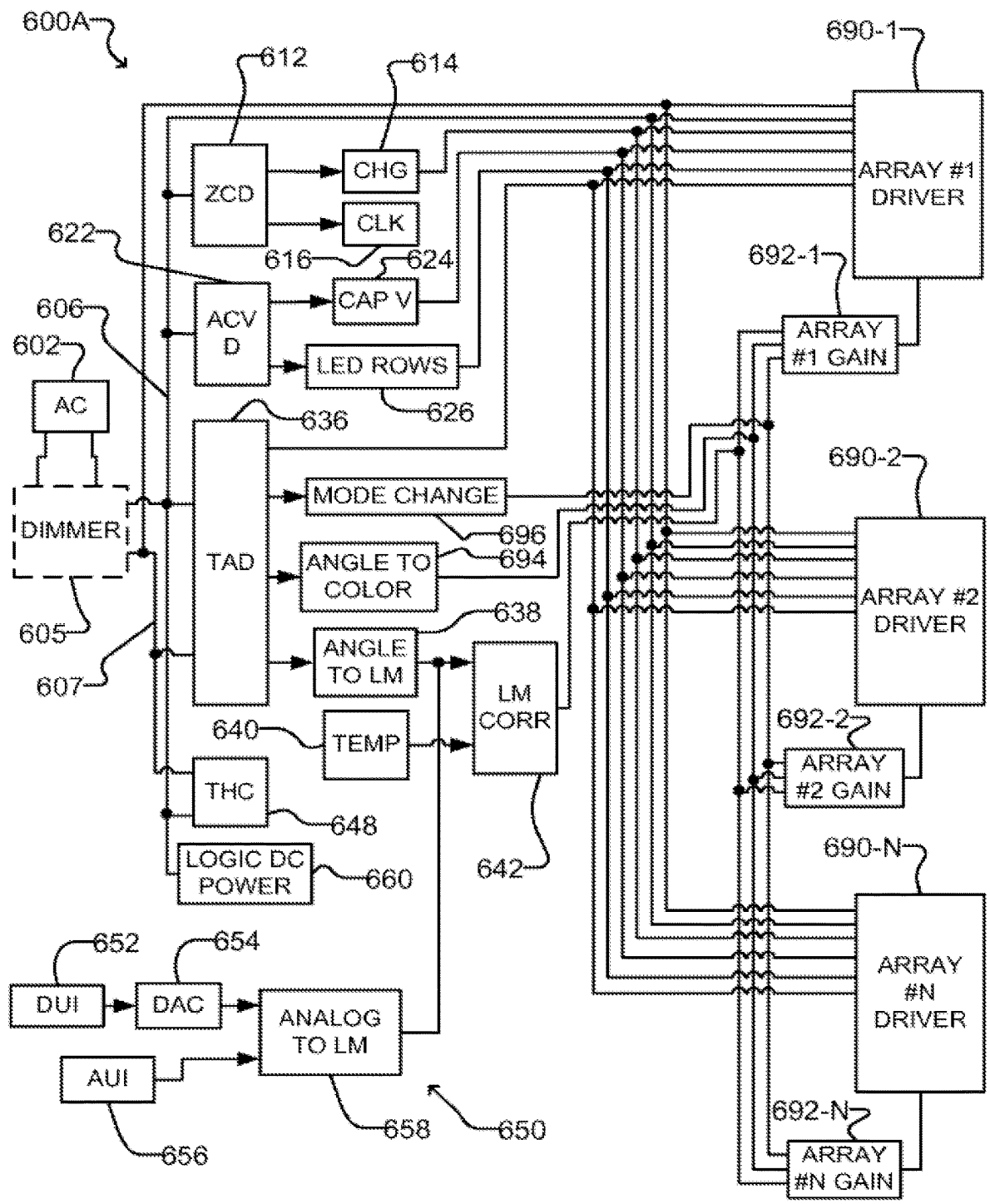
FIG. 6A shows an example control system for a plurality of switched capacitor arrays and switched LED arrays.

The example control system 600 of FIG. 6 is configured to control a single array of LEDs. Control system 600 may be adapted to control multiple arrays of LEDs by duplicating the blocks enclosed within the dashed box shown in FIG. 6, which may collectively be referred to as array driver 690. FIG. 6A shows an example control system 600A configured to control multiple arrays of LEDs.

Control system 600A has a number of blocks in common with control system 600 of FIG. 6, which are identified using the same reference characters in FIG. 6A and, to the extent that the blocks are connected in the same fashion as described with reference to FIG. 6, will not be described again. Control system 600A comprises a plurality of array drivers 690 with different colors of LED arrays. Three array drivers 690 are shown in FIG. 6A, individually numbered as 690-1, 690-2 and 690-N, but it is to be understood that any number of array drivers could be provided.

Array drivers 690-1, 690-2 and 690-N are substantially the same as array driver 690 as shown in FIG. 6. Lines 606 and 607, and the outputs from blocks 604, 624, 626, and 636 are connected to corresponding blocks in each of array drivers 690-1, 690-2 and 690-N in the same way as shown in FIG. 6. Array drivers 690-1, 690-2 and 690-N have an associated gain blocks 692-1, 692-2 and 692-N, respectively coupled to a luminance to power conversion block (not shown in FIG. 6A, see FIG. 6) within the respective array driver. Gain blocks 692-1, 692-2 and 692-N each receive the corrected luminance from luminance correction block 642 (in contrast to FIG. 6, wherein the corrected luminance is provided directly to luminance to power conversion block 644).

Control system 600A also comprises an angle to color conversion block 694 and a mode change detection block 696 which receive the detected phase cut angle from TRIAC angle detection block 636. Angle to color conversion block 694 determines a desired color mixture of light from the different colored LED arrays within driver blocks 690. Mode change detection block 696 monitors the detected phase cut angle for mode change conditions and determines a desired operating mode therefrom. In some embodiments, mode change detection block 696 may be configured to set the desired operating mode to a default mode (e.g. a luminance mode) when the detected phase cut angle has not changed for a predetermined period of time.

In addition to the corrected luminance, gain blocks 692-1, 692-2 and 692-N each receive the desired color mixture and the desired operating mode from color conversion block 694 and a mode change detection block 696, respectively. Gain blocks 692-1, 692-2 and 692-N are configured to adjust the overall luminance of light emitted from the LED arrays of array drivers 690-1, 690-2 and 690-N, the relative luminances of light emitted from the LED arrays of array drivers 690-1, 690-2 and 690-N, or some combination thereof in response to changes in the detected phase cut angle, based on the corrected luminance, the desired color mixture, and the desired operating mode.

Figure 7:
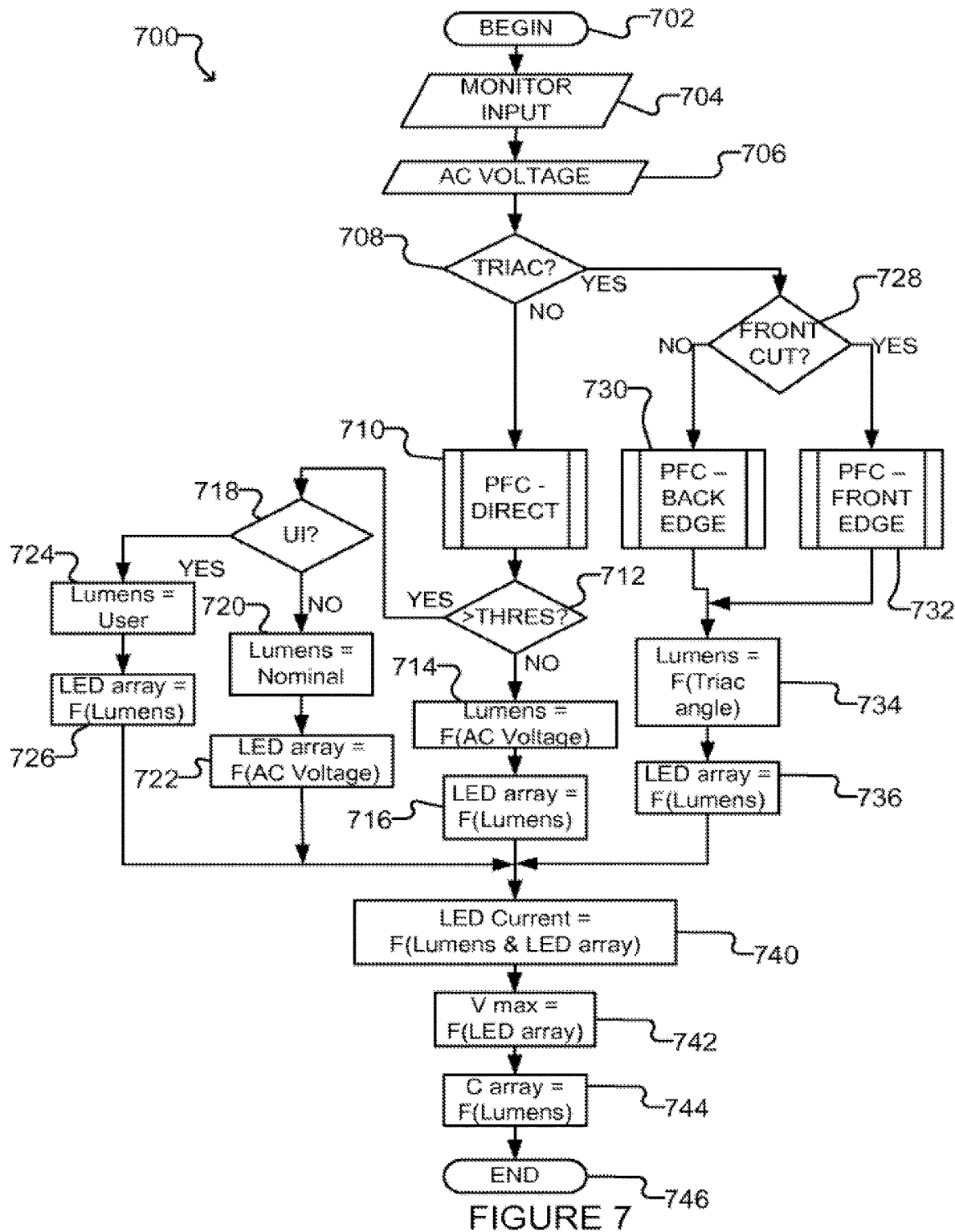
FIG. 7 shows an example method for controlling a switched capacitor array and a switched LED array.

FIG. 7 is a flowchart illustrating an example method 700 for controlling a switched capacitor array and a switched LED array. Method 700 may be carried out, for example by a control system for a switched capacitor array and a switched LED array.

Method 700 begins at step 702. At step 704, the input voltage waveform is monitored. At step 706, an AC voltage level is detected. At step 708, the input voltage waveform is checked to determine if a TRIAC is connected. If no TRIAC is connected, (step 708 NO output), method 700 proceeds to step 710, where any necessary power factor correction is performed, as required by the shape of the input voltage waveform. Power factor correction may be performed by disabling selected branches of the capacitor array, and equally distributing discharge times for the capacitors of non-disabled branches across an entire AC cycle, as described below with reference to FIG. 8B. At step 712, the AC voltage level is compared to a threshold (such as for example, 85V or 180V). If the AC voltage level does not exceed the threshold (step 712 NO output), method 700 proceeds to step 714, where a desired luminance is set based on the AC voltage level, and then to step 716, where the configuration of the switched LED array is set based on the desired luminance.

If the AC voltage level does exceed the threshold (step 712 YES output), method 700 proceeds to step 718, where the presence of an analog or digital user interface control signal is detected. If no user control signal is detected (step 718 NO output), method proceeds to step 720, where the desired luminance is set to a nominal level, and then to step 722, where the configuration of the switched LED array is set based on the AC voltage level. If a user control signal is detected (step 718 YES output), method proceeds to step 724, where the desired luminance is set to based on the user control signal, and then to step 726, where the configuration of the switched LED array is set based on the desired luminance.

Returning to step 708, if a TRIAC is connected, (step 708 YES output), method 700 proceeds to step 728 where the input voltage waveform is checked for a front edge phase cut. If no front edge phase cut is detected (step 728 NO output), method 700 proceeds to step 730, where power factor correction is performed to compensate for a back edge phase cut. If a front edge phase cut is detected (step 728 YES output), method 700 proceeds to step 732, where power factor correction is performed to compensate for a front edge phase cut. Power factor correction applied at steps 730 and 732 is described below with respect to FIG. 8A. After step 730 or 732, method 700 proceeds to step 734, where the desired luminance is set based on the TRIAC angle, then to step 736, where the configuration of the switched LED array is set based on the desired luminance.

After the configuration of the switched LED array is set (in step 716, 722, 726 or 736), method 700 proceeds to step 740, where the switched LED array current is set based on the desired luminance and the configuration of the switched LED array. At step 742 the maximum voltage to be provided to the switched LED array is set based on configuration of the switched LED array. At step 744 the configuration of the switched capacitor array is set based on the desired luminance, taking into account any power factor correction applied in step 710, 730, or 732.

Figure 8A:
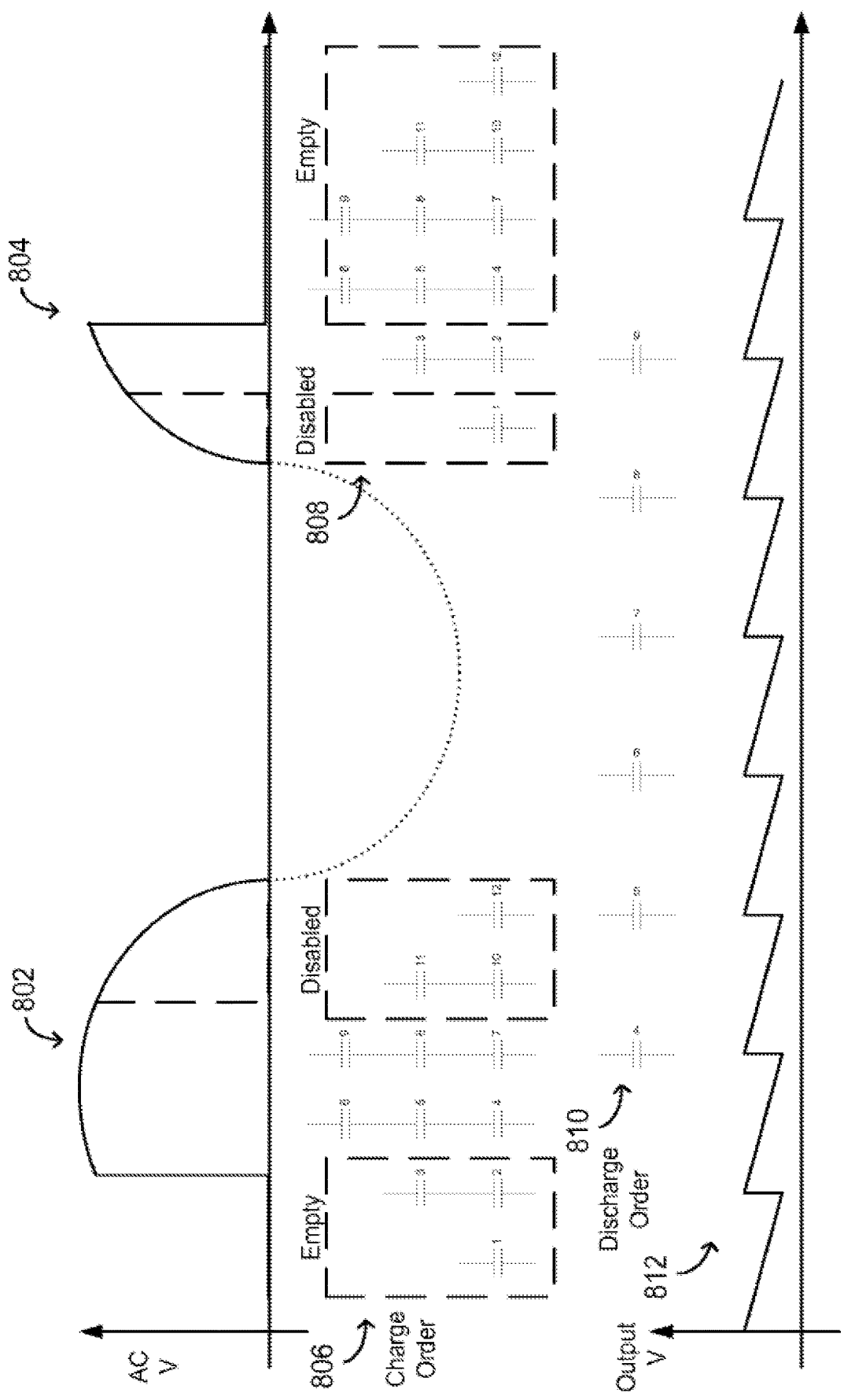
FIGS. 8A-C are voltage and charging graphs for various non-sinusoidal input voltage examples.
Figure 8B:
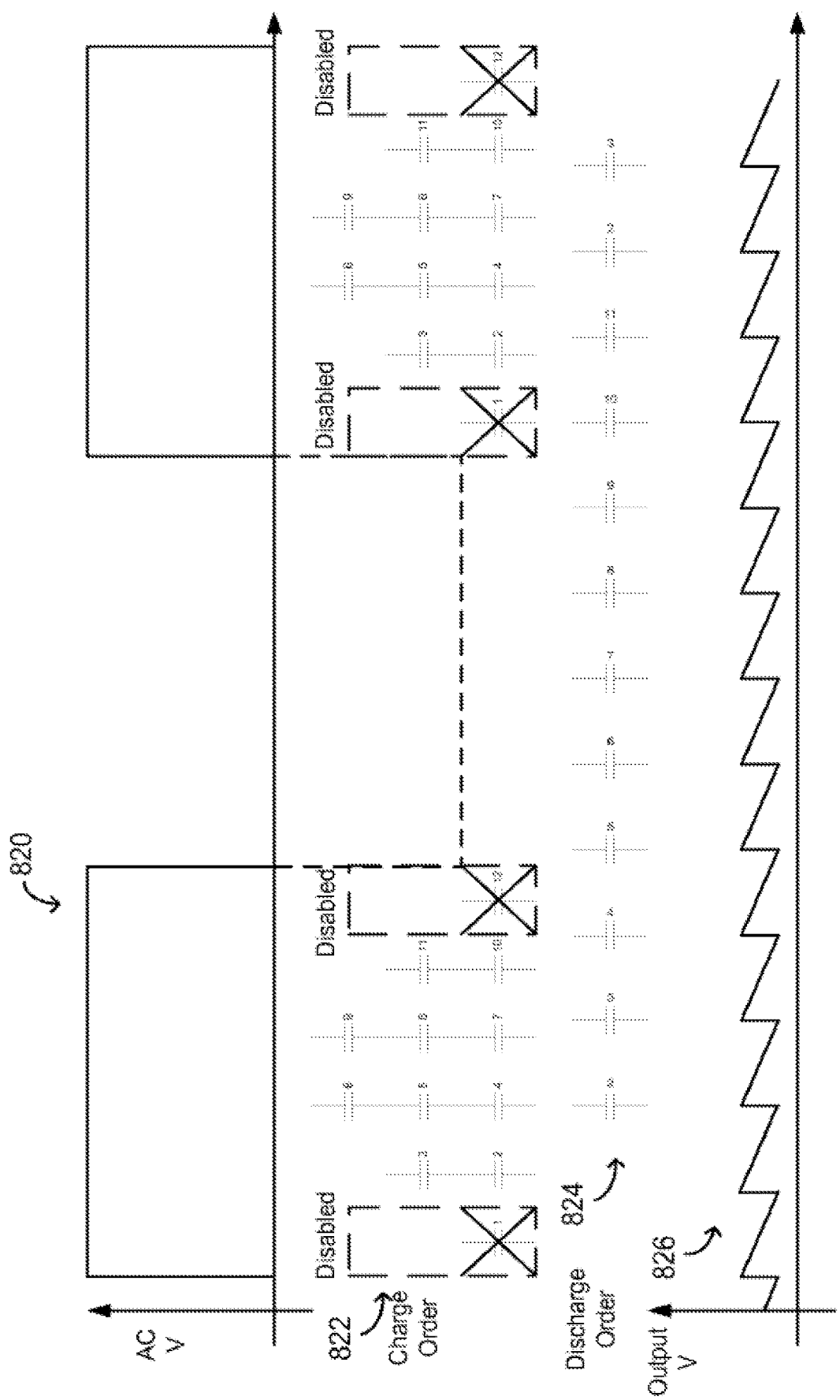
Figure 8C:
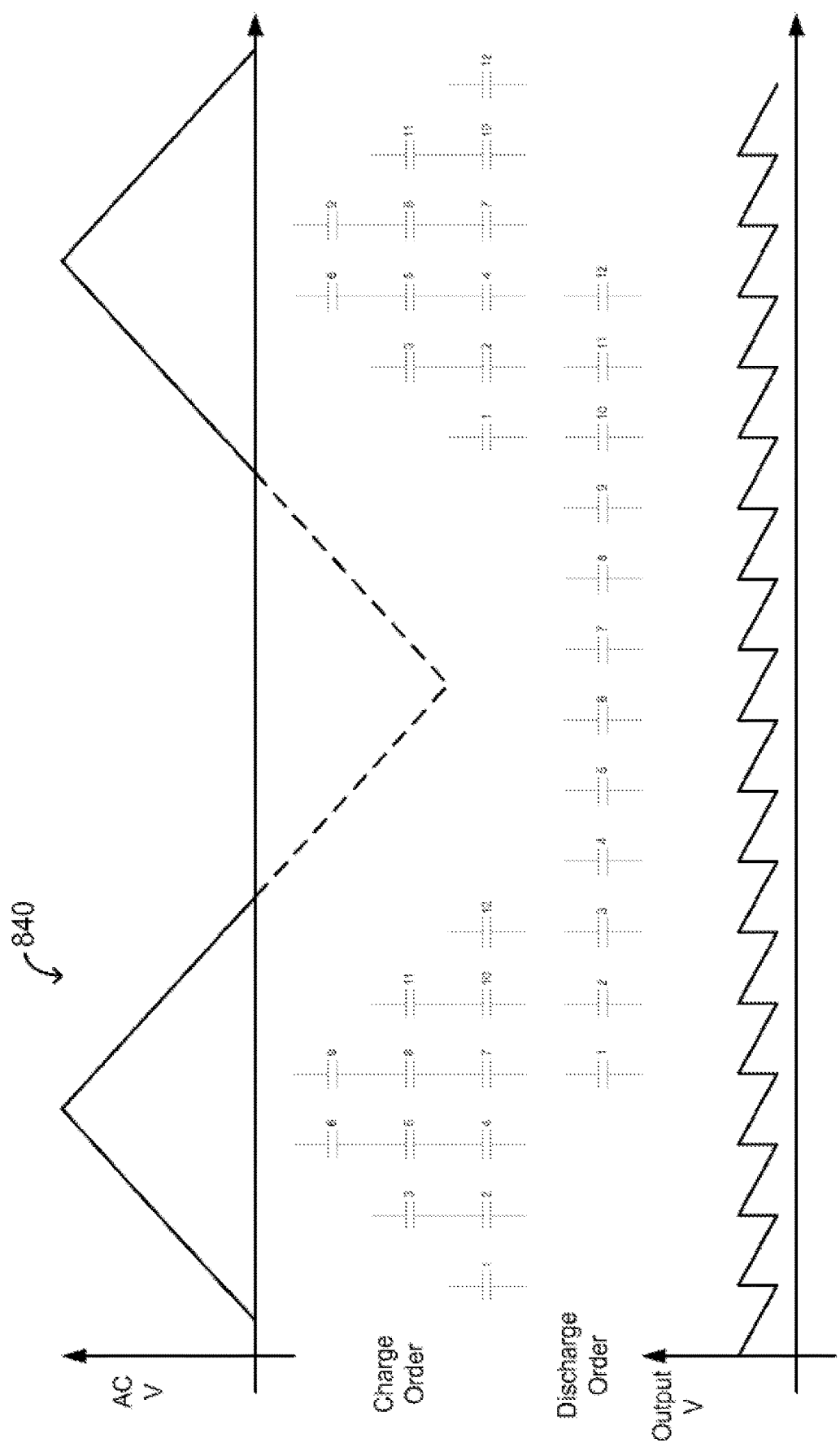

FIG. 8A-C show examples of how a switched capacitor array may be controlled to accommodate non-sinusoidal input voltage waveforms. FIG. 8A shows an example front edge phase cut waveform 802 and an example back edge phase cut waveform 804. Example charging orders 806 and 808 are shown below the respective waveforms 802 and 804. An example discharge order 810 and an associated output waveform 812 are shown for the front edge phase cut example.

In the front edge phase cut example, the first and second branches of capacitors (comprising capacitors labeled 1, 2 and 3) are not charged since there is no input voltage present at the time when those branches would be charged in a sinusoidal input voltage situation, as shown by waveform 802 and charge order 806. In response to detecting such a front phase cut angle, the control system disables charging of the last two branches of capacitors (comprising capacitors labeled 10, 11 and 12), such that only the middle two branches of capacitors are charged. As a result, capacitor charging current is centered around the peak input voltage, resulting in improved power factor. Discharging of the charged capacitors (labeled 4, 5, 6, 7, 8 and 9) is evenly distributed over a complete period of the input voltage, as shown by discharge order 810 and waveform 812.

In the back edge phase cut example, no input voltage is present at the time when the last four branches of capacitors would be charged. Since more than half of the half-wave is cut from example waveform 804, it is not possible for capacitor charging current to be centered around the peak input voltage (because in this example, the peak input voltage occurs just before the input voltage cuts off. However, power factor may be improved by disabling the first branch (comprising the capacitor labeled 1). No discharge order is shown for the back edge phase cut example, but it is to be understood that discharging of the charged capacitors (labeled 2 and 3) may be evenly distributed over a complete period of the input voltage.

FIG. 8B shows an example square wave input waveform 820. As shown in example charging order 822, the first and last branches of capacitors (comprising capacitors labeled 1 and 12, respectively) are disabled to prevent the current being provided to the capacitor array from exceeding a maximum desired current. As shown in example discharging order 824 and output voltage waveform 826, discharging of the charged capacitors (labeled 2 through 11) is evenly distributed over a complete period of the input voltage.

FIG. 8C shows an example triangle wave input waveform 840. Charging and discharging of the capacitors may be controlled in substantially the same fashion as for a sinusoidal input voltage, and no capacitors are disabled.

Figure 9:
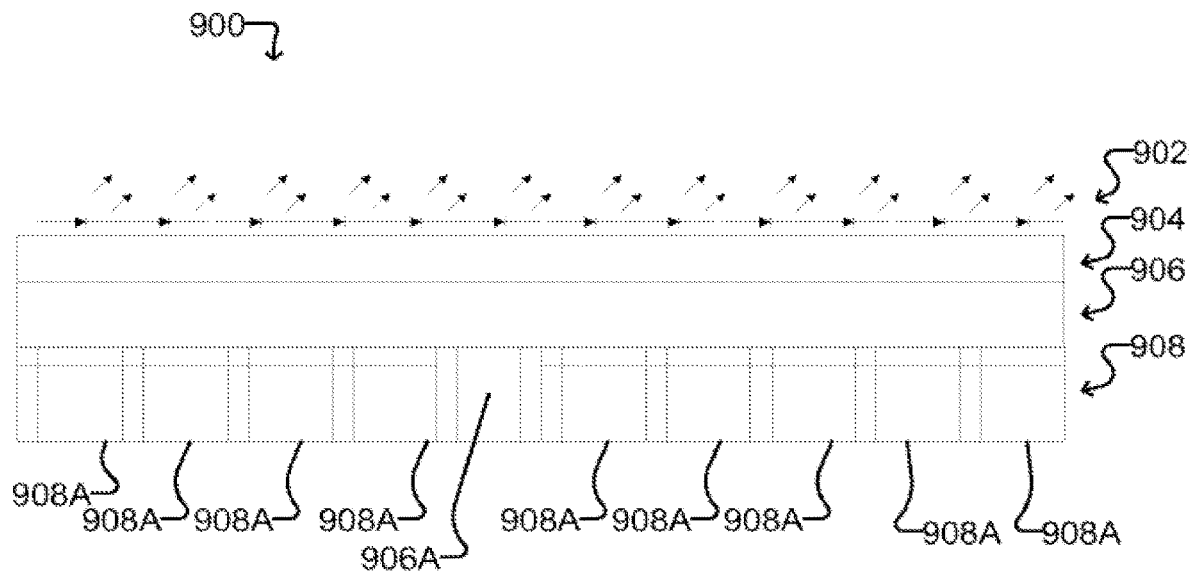
FIG. 9 is a cross section showing an example lighting fixture architecture.

FIG. 9 is a cross section showing an example lighting fixture architecture 900. An LED layer 902, which may comprise a GaAs layer, is positioned atop a substrate 904. A control layer 906 is positioned below substrate 904. A capacitor layer 908 comprising a plurality of capacitor blocks 908A are positioned below control layer 906. A portion 906A of control layer 906 may extend between blocks 908A.

Figure 10:
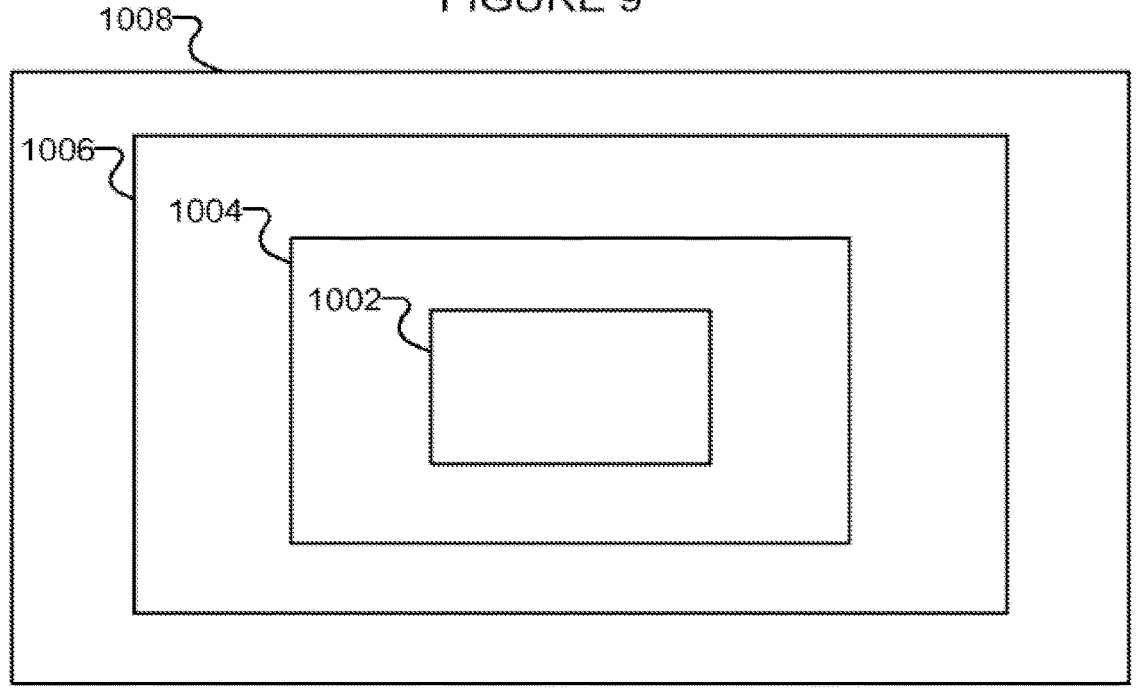
FIG. 10 shows an example switched LED array layout.

FIG. 10 shows an example switched LED array layout 1000. In the FIG. 10 example, a plurality of LEDs of a switched LED array are arranged in concentrically oriented groups 1002, 1004, 1006 and 1008. The LEDs within each of groups 1002, 1004, 1006 and 1008 may be in the same level of the switched LED array. For example, with reference to FIGS. 3A, 3C and 3E, group 1002 may contain LEDs in level 314-F, group 1004 may contain LEDs in level 314-1, group 1006 may contain LEDs in level 314-2, and group 1008 may contain LEDs in level 314-3. Alternatively, group 1002 may contain LEDs in level 314-3, group 1004 may contain LEDs in level 314-2, group 1006 may contain LEDs in level 314-1, and group 1008 may contain LEDs in level 314-F. The FIG. 10 example shows four rectangular groups, but it is to be under stood that the LEDs may be arranged into a different number of groups and/or groups having different shapes. In some embodiments, providing concentric layouts of groups of LEDs may allow a switched LED array to be perceived as a single point source of light in all, or substantially all, switching and dimming configurations.

Aspects of the invention include, without limitation:

A. An apparatus comprising:
  a switched capacitor array connected between an input connectable to a varying input voltage and an output connectable to a load, the switched capacitor array comprising a plurality of capacitors arranged in a plurality of branches having different numbers of capacitors, and a plurality of switches connected to selectively couple the capacitors across the input or the output; and,
  a control system configured to operate the switches to connect the capacitors of a selected branch in series across the input to charge the capacitors of the selected branch, wherein the selected branch has a number of capacitors selected based on an input voltage level and the selected branch varies as the input voltage level changes, and operate the switches to sequentially connect capacitors of branches other than the selected branch across the output to discharge the capacitors.

B. A method comprising:
  determining an input voltage waveform present at an input;
  sequentially connecting selected branches of a plurality of branches of series connected capacitors across the input to be charged, wherein a number of series connected capacitors in the selected branches varies based on the input voltage waveform; and
  sequentially connecting charged capacitors across an output to be discharged.

C. An apparatus comprising:
  a switched LED array comprising a plurality of strings of LEDs, each string selectably connectable in parallel across an input and comprising a selectable number of series connected LEDs, wherein the plurality of strings comprise strings with different selectable numbers of series connected LEDs; and
  a control system configured to dynamically vary a number of active strings connected in parallel across the input and the selectable number of series connected LEDs in the active strings based on a voltage level at the input.

D. An apparatus comprising:
  a first input connectable to a first line of an AC voltage source;
  a second input connectable to a second line of the AC voltage
  a first block comprising a first switchable capacitor array connected to the first input and the second input and a first switchable LED array connected to the first switchable capacitor array and the first input; and,
  a second block comprising a second switchable capacitor array connected to the first input and the second input and a second switchable LED array connected to the second switchable capacitor array and the second input.

E. An apparatus according to aspect D wherein the AC voltage source comprises a three phase voltage source, the apparatus comprising:
  a third input connectable to a third line of the AC voltage source;
  a third block comprising a third switchable capacitor array connected to the second input and the third input and a third switchable LED array connected to the third switchable capacitor array and the second input;
  a fourth block comprising a fourth switchable capacitor array connected to the second input and the third input and a fourth switchable LED array connected to the fourth switchable capacitor array and the third input;
  a fifth block comprising a fifth switchable capacitor array connected to the first input and the third input and a fifth switchable LED array connected to the fifth switchable capacitor array and the first input; and,
  a sixth block comprising a sixth switchable capacitor array connected to the first input and the third input and a sixth switchable LED array connected to the sixth switchable capacitor array and the third input.

F. An apparatus comprising:
  a first input connectable to a first line of a three phase AC voltage source;
  a second input connectable to a second line of the AC voltage source;
  a third input connectable to a third line of the AC voltage source;
  a fourth input connectable to a neutral of the AC voltage source;
  a first block comprising a first switchable capacitor array connected to the first input and the fourth input and a first switchable LED array connected to the first switchable capacitor array and the first input; and,
  a second block comprising a second switchable capacitor array connected to the first input and the fourth input and a second switchable LED array connected to the second switchable capacitor array and the fourth input;
  a third block comprising a third switchable capacitor array connected to the second input and the fourth input and a third switchable LED array connected to the third switchable capacitor array and the second input;
  a fourth block comprising a fourth switchable capacitor array connected to the second input and the fourth input and a fourth switchable LED array connected to the fourth switchable capacitor array and the fourth input;
  a fifth block comprising a fifth switchable capacitor array connected to the third input and the fourth input and a fifth switchable LED array connected to the fifth switchable capacitor array and the third input; and,
  a sixth block comprising a sixth switchable capacitor array connected to the third input and the fourth input and a sixth switchable LED array connected to the sixth switchable capacitor array and the fourth input.

G. A control system for an array of LEDs, the control system configured to monitor a current and a voltage provided to the array of LEDs to determine an actual LED power and control the LEDs based on the actual LED power.

H. A method for controlling an array of LEDs, the method comprising:
  monitoring a current and a voltage provided to the array of LEDs;
  determining an actual power of the array of LEDs; and
  controlling the array of LEDs based on the actual power.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus comprising:
   a switched LED array comprising a plurality of strings of LEDs, each string selectably connectable in parallel across an input and comprising a selectable number of series connected LEDs, wherein the plurality of strings comprise strings with different selectable numbers of series connected LEDs; and
   a control system configured to dynamically vary a number of active strings connected in parallel across the input and the selectable number of series connected LEDs in the active strings based on a voltage level at the input by connecting selected strings of LEDs to connected capacitors across the Input to be charged, wherein a number of connected capacitors in the selected branches varies based on the voltage level at the input, and connecting charged capacitors across an output to be discharged.

2. An apparatus according to claim 1 wherein the control system is configured to increase the number of active strings and decrease the selectable number of series connected LEDs in the active strings in response to a decreasing voltage level at the input.

3. An apparatus according to claim 1 wherein each string has at least a fixed number of series connected LEDs such that the selectable number of series connected LEDs is at least the fixed number.

4. An apparatus according to claim 3 comprising one or more additional fixed strings of LEDs selectably connectable in parallel across the input, wherein the additional fixed strings of LEDs each comprise the fixed number of series connected LEDs.

5. An apparatus according to claim 1 wherein the selectable number of series connected LEDs are arranged into a plurality of selectable levels.

6. An apparatus according to claim 5 wherein the plurality of strings are arranged into a plurality of sub-arrays, each sub-array comprising one or more strings wherein the selectable number of series connected LEDs include LEDs in a different number of levels.

7. An apparatus according to claim 6 wherein the LEDs are arranged into a plurality of concentrically oriented groups, and wherein the LEDs of each group are in the same level.

8. An apparatus according to claim 1 wherein the control system is configured to maintain a desired current through the LEDs.

9. An apparatus according to claim 1 wherein the control system is configured to monitor a current and a voltage provided to the array of LEDs to determine an actual LED power and control the LEDs based on the actual LED power.

* * * * *